US012763028B2

(12) United States Patent
Sun et al.

(10) Patent No.: US 12,763,028 B2
(45) Date of Patent: Oct. 13, 2026

(54) SHIFT REGISTER UNIT, GATE DRIVE CIRCUIT, DISPLAY PANEL, AND DRIVING METHOD

(71) Applicants: Beijing BOE Technology Development Co., Ltd., Beijing (CN); BOE Technology Group Co., Ltd., Beijing (CN)

(72) Inventors: Tuo Sun, Beijing (CN); Li Wang, Beijing (CN); Xiyu Zhao, Beijing (CN); Libin Liu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/881,049

(22) PCT Filed: Apr. 16, 2024

(86) PCT No.: PCT/CN2024/088112
§ 371 (c)(1),
(2) Date: Jan. 3, 2025

(87) PCT Pub. No.: WO2024/244741
PCT Pub. Date: Dec. 5, 2024

(65) Prior Publication Data
US 2026/0018133 A1 Jan. 15, 2026

(30) Foreign Application Priority Data
May 26, 2023 (CN) ......................... 202310609661.3

(51) Int. Cl.
*G09G 3/3266* (2016.01)
*G09G 3/20* (2006.01)
*G09G 3/3208* (2016.01)

(52) U.S. Cl.
CPC ............. *G09G 3/3266* (2013.01); *G09G 3/20* (2013.01); *G09G 3/3208* (2013.01);
(Continued)

(58) Field of Classification Search
CPC ...... G09G 3/3266; G09G 3/20; G09G 3/3208; G09G 2310/0286; G09G 2310/04;
(Continued)

(56) References Cited

U.S. PATENT DOCUMENTS 10,127,862 B2 * 11/2018 Ma ........................ G09G 3/3677
10,223,993 B2 * 3/2019 Zheng .................. G09G 3/3677
(Continued)

FOREIGN PATENT DOCUMENTS

CN 108346405 A 7/2018
CN 106971692 B 12/2018
(Continued)

*Primary Examiner* — Michael J Jansen, II
(74) *Attorney, Agent, or Firm* — Workman Nydegger

(57) ABSTRACT

A shift register unit, a gate drive circuit, a display panel, and a driving method. An example shift register unit includes: a first shift register, which is configured to output a cascade signal by a cascade output end; a sampling circuit, which is coupled to a first node and is configured to provide a signal at an enabling end to the first node in response to a signal at a sampling control end; and a control circuit, which is coupled to the cascade output end and the first node, and is configured to output, in response to a signal of the first node, a gate scanning signal having the same time sequence as the cascade signal by a driving output end, or to output a gate cut-off signal by the driving output end.

12 Claims, 28 Drawing Sheets

(52) U.S. Cl.
CPC . *G09G 2310/0286* (2013.01); *G09G 2310/04* (2013.01); *G09G 2310/08* (2013.01); *G09G 2330/021* (2013.01); *G09G 2340/0435* (2013.01)

(58) Field of Classification Search
CPC ......... G09G 2310/08; G09G 2330/021; G09G 2340/0435
See application file for complete search history.

(56) References Cited

U.S. PATENT DOCUMENTS

| | | | | |
|---|---|---|---|---|
| 10,825,539 | B2 * | 11/2020 | Feng | G09G 3/3208 |
| 11,127,355 | B2 * | 9/2021 | Feng | G09G 3/3208 |
| 11,250,784 | B2 * | 2/2022 | Yuan | G11C 19/28 |
| 11,348,534 | B2 * | 5/2022 | Feng | G09G 3/3266 |
| 11,367,400 | B2 * | 6/2022 | Kim | G09G 3/3266 |
| 11,600,231 | B2 * | 3/2023 | Kim | G09G 3/3266 |
| 11,854,458 | B2 * | 12/2023 | Huang | G09G 3/2092 |
| 12,002,407 | B2 * | 6/2024 | Shang | G09G 3/3266 |
| 12,211,447 | B2 * | 1/2025 | Shang | G09G 3/3266 |
| 12,322,355 | B1 * | 6/2025 | Wang | G11C 19/287 |
| 12,573,345 | B2 * | 3/2026 | Seo | G09G 3/3266 |
| 2018/0047341 | A1 * | 2/2018 | Ma | G09G 3/36 |
| 2018/0357974 | A1 * | 12/2018 | Zheng | G09G 3/3677 |
| 2020/0035316 | A1 * | 1/2020 | Feng | G11C 19/28 |
| 2020/0357342 | A1 * | 11/2020 | Feng | G09G 3/3208 |
| 2021/0150988 | A1 * | 5/2021 | Yuan | G09G 3/20 |
| 2021/0327363 | A1 * | 10/2021 | Feng | G11C 19/28 |
| 2021/0407431 | A1 * | 12/2021 | Kim | G09G 3/3225 |
| 2022/0044638 | A1 * | 2/2022 | Kim | G09G 3/3266 |
| 2022/0343828 | A1 * | 10/2022 | Huang | G09G 3/2092 |
| 2023/0005415 | A1 * | 1/2023 | Shang | G09G 3/2096 |
| 2024/0071312 | A1 * | 2/2024 | Shang | G11C 19/28 |
| 2024/0290277 | A1 * | 8/2024 | Seo | G09G 3/3266 |
| 2024/0312421 | A1 * | 9/2024 | Ono | G09G 3/3677 |
| 2025/0124879 | A1 * | 4/2025 | Shang | G09G 3/3266 |

FOREIGN PATENT DOCUMENTS

| | | | |
|---|---|---|---|
| CN | 110415637 | A | 11/2019 |
| JP | 2004241917 | A | 3/2006 |
| KR | 20040090128 | A | 10/2004 |

* cited by examiner

–Prior Art--

–Prior Art--

--Prior Art--

SHIFT REGISTER UNIT, GATE DRIVE CIRCUIT, DISPLAY PANEL, AND DRIVING METHOD

CROSS REFERENCE TO RELATED APPLICATIONS

The present application is a US National Stage of International Application No. PCT/CN2024/088112, filed on Apr. 16, 2024, which claims the priority from Chinese Patent Application No. 202310609661.3, filed with the China National Intellectual Property Administration on May 26, 2023 and entitled "Shift Register Unit, Gate Drive Circuit, Display Panel, and Drive Method", which is hereby incorporated by reference in its entirety.

TECHNICAL FIELD

The disclosure relates to the field of display technology, in particular to a shift register unit, gate drive circuit, display panel, and drive method.

BACKGROUND

Display panels such as Organic Light-Emitting Diode (OLED) display panels and Quantum Dot Light Emitting Diodes (QLED) display panels generally include multiple pixel units. Each pixel unit can include multiple sub-pixels of different colors. By controlling the brightness of these sub-pixels of different colors, the color required to be displayed can be obtained by mixing, and then the color image can be displayed.

SUMMARY

Some embodiments of the disclosure provide a shift register unit, including a first shift register, a sampling circuit and a control circuit. The first shift register is configured to output a cascade signal via a cascade output terminal. The sampling circuit is coupled to a first node, and is configured to provide a signal from an enable terminal to the first node in response to a signal from a sampling control terminal. The control circuit is coupled to the cascade output terminal and the first node, and is configured to, in response to a signal at the first node, output a gate scan signal with a same timing diagram as the cascade signal via a drive output terminal, or output a gate off signal via the drive output terminal.

In some possible embodiments of the disclosure, the sampling circuit is further configured to provide the signal from the enable terminal to the first node in response to the signal from the sampling control terminal during a sampling phase. The sampling phase is between a start moment of an active level of a cascade signal of a previous-level shift register unit and a start moment of an active level of a cascade signal of a current-level shift register unit.

In some possible embodiments of the disclosure, the sampling control terminal includes a first sampling control terminal and a second sampling control terminal. The sampling circuit is further configured to provide the signal from the enable terminal to the first node in response to both signals from the first sampling control terminal and the second sampling control terminal.

In some possible embodiments of the disclosure, a first sampling control terminal of the current-level shift register unit is coupled to a cascade output terminal of the current-level shift register unit, and a second sampling control terminal of the current-level shift register unit is coupled to a cascade output terminal of the previous-level shift register unit. The sampling circuit is further configured to provide the signal from the enable terminal to the first node in response to the cascade signal of the current-level shift register unit and the cascade signal of the previous-level shift register unit during the sampling phase.

In some possible embodiments of the disclosure, the first sampling control terminal of the current-level shift register unit is coupled to a pull-down node of the current-level shift register unit, and the second sampling control terminal of the current-level shift register unit is coupled to a pull-up node of the current-level shift register unit. The sampling circuit is further configured to provide the signal from the enable terminal to the first node in response to a signal at the pull-down node and a signal at the pull-up node of the current-level shift register unit during the sampling phase.

In some possible embodiments of the disclosure, the sampling circuit includes a first transistor and a second transistor. A gate of the first transistor is coupled to the first sampling control terminal, a first terminal of the first transistor is coupled to the enable terminal, a second terminal of the first transistor is coupled to a first terminal of the second transistor, a gate of the second transistor is coupled to the second sampling control terminal, and a second terminal of the second transistor is coupled to the first node. Or, a gate of the first transistor is coupled to the second sampling control terminal, a first terminal of the first transistor is coupled to the enable terminal, a second terminal of the first transistor is coupled to a first terminal of the second transistor, a gate of the second transistor is coupled to the first sampling control terminal, and a second terminal of the second transistor is coupled to the first node.

In some possible embodiments of the disclosure, the sampling circuit includes a third transistor. A gate of the third transistor is coupled to the sampling control terminal, a first terminal of the third transistor is coupled to the enable terminal, and a second terminal of the third transistor is coupled to the first node.

In some possible embodiments of the disclosure, the shift register unit further includes a second shift register. The second shift register is coupled to the sampling control terminal and is configured to input a signal to the sampling control terminal based on a sampling control input terminal, a first sampling control clock signal terminal, and a second sampling control clock signal terminal.

In some possible embodiments of the disclosure, the control circuit includes: a first control sub-circuit, a second control sub-circuit, a third control sub-circuit, a fourth control sub-circuit, and a fifth control sub-circuit. The first control sub-circuit is configured to provide a signal from a first reference signal terminal to a third node or provide a signal at a fourth node to the third node, in response to the cascade signal from the cascade signal terminal. The second control sub-circuit is configured to provide the signal from the first reference signal terminal to a second node or provide a signal from a fifth node to the second node, in response to a signal at the third node. The third control sub-circuit is configured to provide a signal from a second reference signal terminal to the fourth node and the fifth node, in response to a signal at the first node. The fourth control sub-circuit is configured to provide the signal from the first reference signal terminal to a sixth node or provide the signal from the second reference signal terminal to the sixth node, in response to a signal from the second node. The fifth control sub-circuit is configured to provide the signal from the first reference signal terminal to the drive output terminal or provide the signal from the second reference signal terminal to the drive output terminal, in response to a signal at the sixth node.

In some possible embodiments of the disclosure, the first control sub-circuit includes: a first control transistor and a second control transistor. A gate of the first control transistor is coupled to the cascade output terminal, a first terminal of the first control transistor is coupled to the first reference signal terminal, and a second terminal of the first control transistor is coupled to the third node. A gate of the second control transistor is coupled to the cascade output terminal, a first terminal of the second control transistor is coupled to the third node, and a second terminal of the second control transistor is coupled to the fourth node.

In some possible embodiments of the disclosure, the second control sub-circuit includes: a fourth control transistor, a fifth control transistor, and a first capacitor. A gate of the fourth control transistor is coupled to the third node, a first terminal of the fourth control transistor is coupled to the first reference signal terminal, and a second terminal of the fourth control transistor is coupled to the second node. A gate of the fifth control transistor is coupled to the third node, a first terminal of the fifth control transistor is coupled to the second node, and a second terminal of the fifth control transistor is coupled to the fifth node. A first electrode of the first capacitor is coupled to the first reference signal terminal, and a second electrode of the first capacitor is coupled to the gate of the fourth control transistor.

In some possible embodiments of the disclosure, the third control sub-circuit includes: a third control transistor, a sixth control transistor, and a second capacitor. A gate of the third control transistor is coupled to the first node, a first terminal of the third control transistor is coupled to the fourth node, and a second terminal of the third control transistor is coupled to the second reference signal terminal. A gate of the sixth control transistor is coupled to the first node, a first terminal of the sixth control transistor is coupled to the fifth node, and a second terminal of the sixth control transistor is coupled to the second reference signal terminal. A first electrode of the second capacitor is coupled to the first node, and a second electrode of the second capacitor is coupled to the second reference signal terminal.

In some possible embodiments of the disclosure, the fourth control sub-circuit includes: a seventh control transistor, an eighth control transistor, and a third capacitor. A gate of the seventh control transistor is coupled to the second node, a first terminal of the seventh control transistor is coupled to the first reference signal terminal, and a second terminal of the seventh control transistor is coupled to the sixth node. A gate of the eighth control transistor is coupled to the second node, a first terminal of the eighth control transistor is coupled to the sixth node, and a second terminal of the eighth control transistor is coupled to the second reference signal terminal. A first electrode of the third capacitor is coupled to the second node, and a second electrode of the third capacitor is coupled to the second reference signal terminal.

In some possible embodiments of the disclosure, the fifth control sub-circuit includes: a ninth control transistor and a tenth control transistor. A gate of the ninth control transistor is coupled to the sixth node, a first terminal of the ninth control transistor is coupled to the first reference signal terminal, and a second terminal of the ninth control transistor is coupled to the drive output terminal. A gate of the tenth control transistor is coupled to the sixth node, a first terminal of the tenth control transistor is coupled to the drive output terminal, and the second terminal of the tenth control transistor is coupled to the second reference signal terminal.

Some embodiments of the disclosure provide a gate driving circuit, including: a plurality of the above-described shift register units. The first shift registers in the plurality of shift register units are cascaded.

Some embodiments of the disclosure provide a display panel, including: a plurality of gate lines and the above-described gate driving circuit. One gate line of the plurality of gate lines is coupled to a drive output terminal of one shift register unit in the gate driving circuit.

Some embodiments of the disclosure provide a drive method for the shift register unit, including: the first shift register outputs the cascade signal via the cascade output terminal; the sampling circuit provides the signal from the enable terminal to the first node in response to the signal from the sampling control terminal; and the control circuit outputs the gate scan signal with the same timing diagram as the cascade signal via the drive output terminal or outputs the gate off signal via the drive output terminal, in response to the signal at the first node.

DETAILED DESCRIPTION

Figure 1:
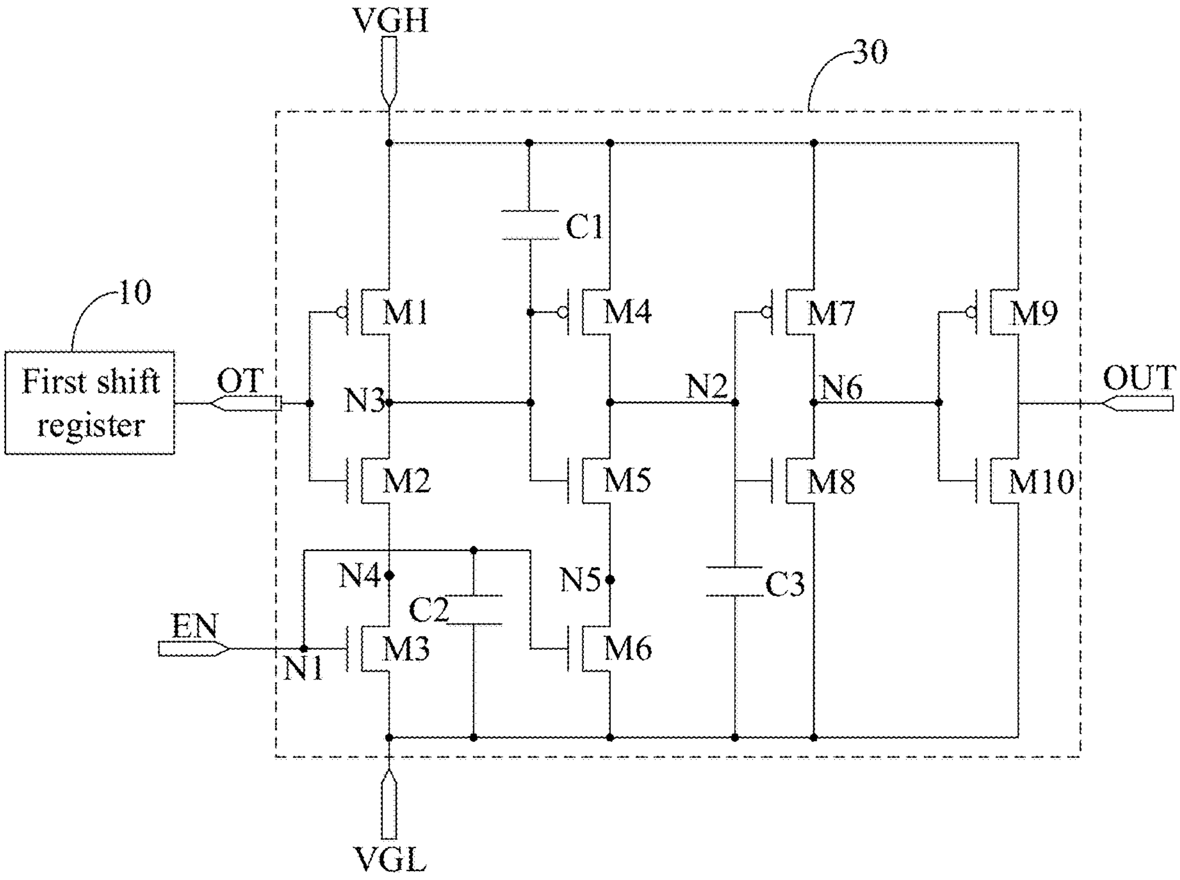
FIG. 1 shows a schematic diagram of some of a structure of a shift register unit in the related art.

In order to make objectives, technical solutions and advantages of the embodiments of the disclosure clearer, the technical solutions of the embodiments of the disclosure are described clearly and completely below with reference to the drawings of the embodiments of the disclosure. Apparently, the described embodiments are some, not all, of the embodiments of the disclosure. The embodiments in the disclosure and the features in the embodiments may be combined with each other without conflict. Based on the described embodiments of the disclosure, all other embodiments obtained by those of ordinary skill in the art without inventive efforts fall within the protection scope of the disclosure.

Unless otherwise indicated, the technical or scientific terms used in the disclosure shall have the usual meanings understood by a person of ordinary skill in the art to which the disclosure belongs. The words "first", "second" and the like used in the disclosure do not indicate any order, quantity or importance, but are only used to distinguish different components. The word "including" or "containing" and the like, means that an element or item preceding the word covers an element or item listed after the word and the equivalent thereof, without excluding other elements or items. The word "connection" or "coupling" and the like is not restricted to physical or mechanical connection, but may include electrical connection, whether direct or indirect.

It should be noted that sizes and shapes of all figures in the drawings do not reflect a true scale and are only intended to illustrate the contents of the disclosure. Same or similar reference signs indicate same or similar elements or elements with the same or similar function throughout the disclosure.

In embodiments the disclosure, a display panel includes a plurality of pixel units arranged in an array, and each pixel unit includes multiple sub-pixels. For example, a pixel unit may include red a sub-pixel, a green sub-pixel, and a blue sub-pixel, enabling color display through RGB color mixing. Alternatively, the pixel unit may include red, green, blue, and white sub-pixels, which can achieve color display through RGBW mixing. Of course, in practical applications, the emission colors of the sub-pixels in the pixel unit can be designed based on the specific application environment, which is not limited here.

The application scope of Organic Light-Emitting Diode (OLED) display panels has gradually expanded from small and medium-sized devices, such as watches, smartphones, and tablets, to personal computers (PCs) and monitors. To achieve better display performance (e.g., reducing ghosting effects and increasing screen response speed), the refresh rate of the display panel has been gradually increased. However, this increased refresh rate simultaneously raises the power consumption of the system's graphics processing unit (GPU) and integrated circuits (ICs). In practical usage scenarios, only portions of the screen content are typically dynamic (e.g., video playback, gaming windows), while other areas remain static and do not require a high refresh rate (e.g., comment sections, advertisements).

To reduce power consumption, systems have developed partial-refresh functionality, such as the Panel Self-Refresh two (PSR2) feature under the Embedded DisplayPort (EDP) standard in digital display technology. Display panels need to develop corresponding capabilities to meet this requirement.

Figure 2:
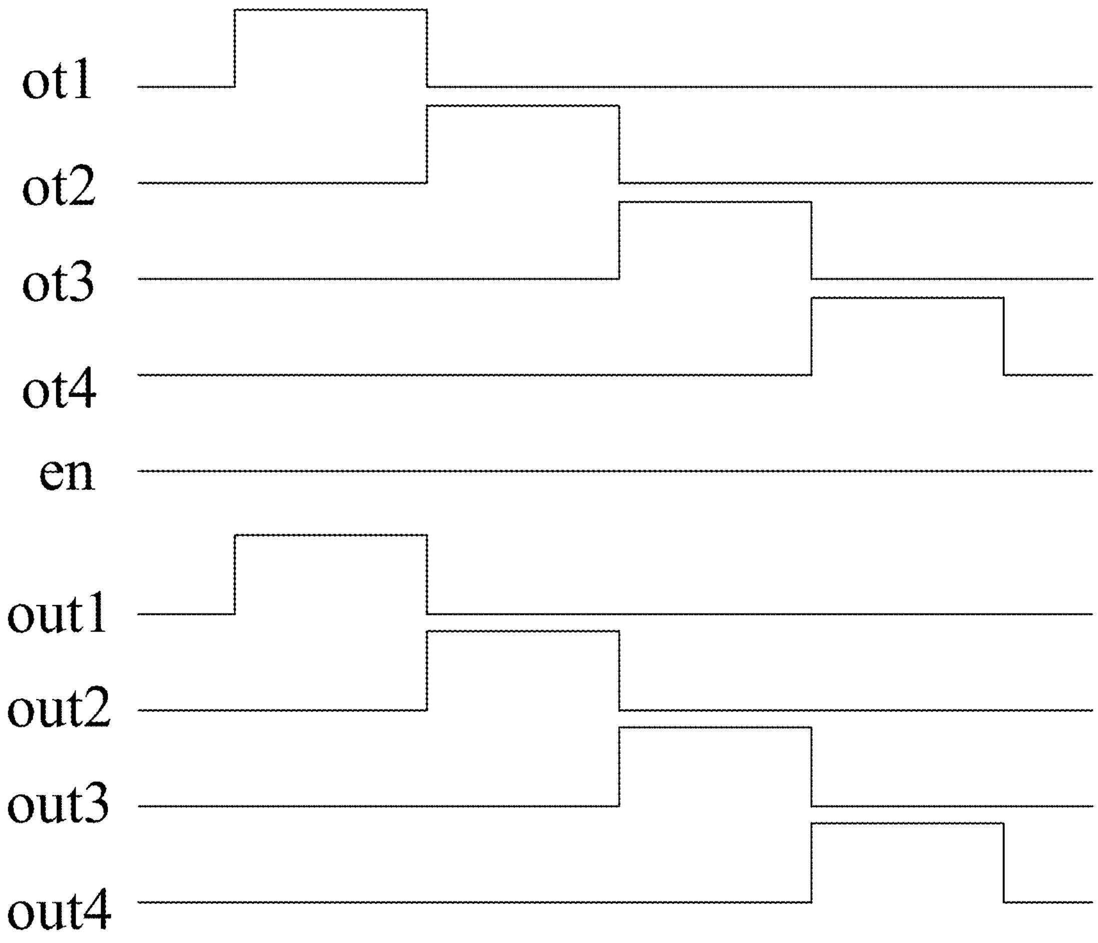
FIG. 2 shows a timing chart for some signals in the related art.
Figure 3:
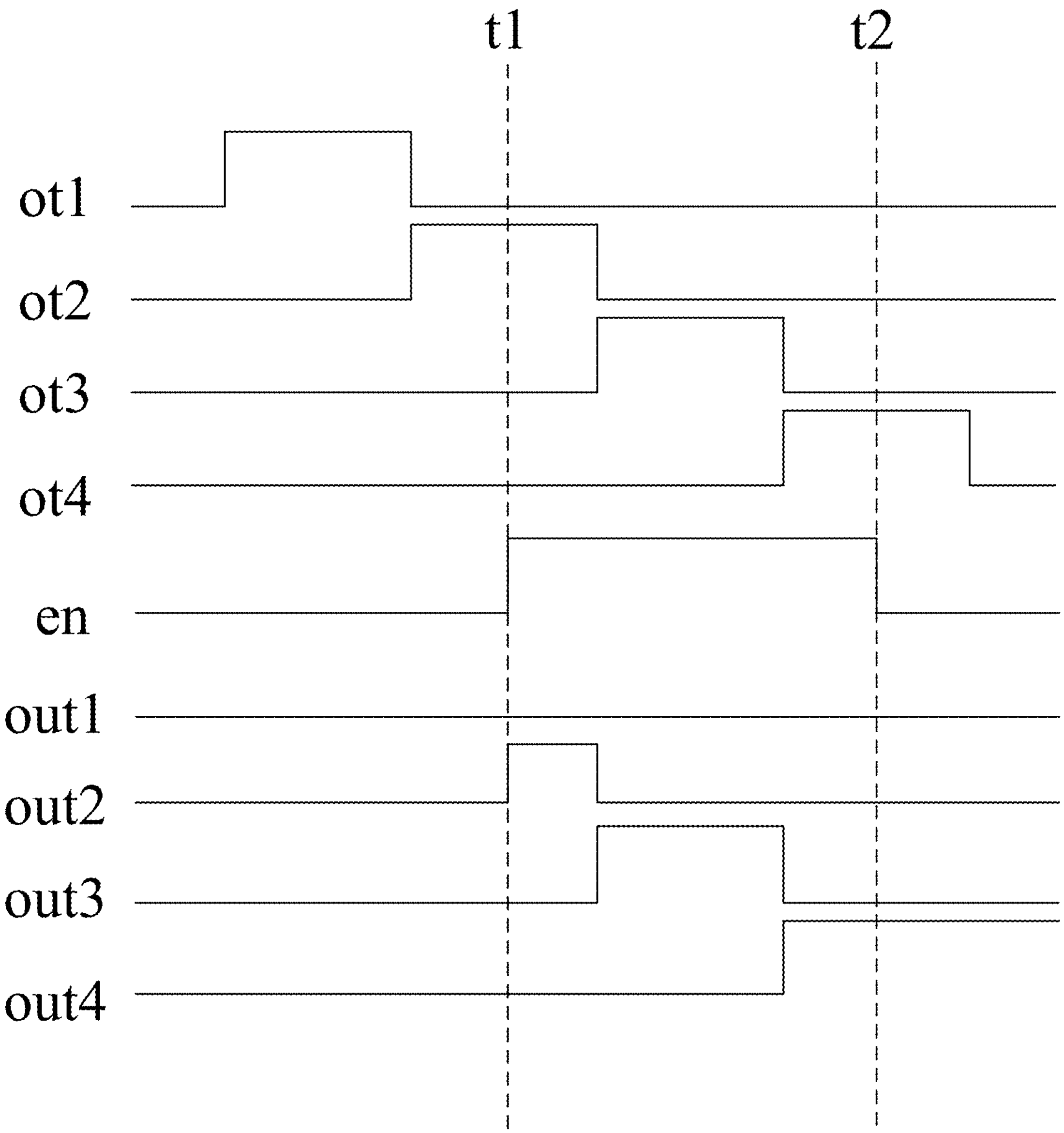
FIG. 3 shows another timing chart for some signals in the related art.

As shown in FIGS. 1 to 3, the display panel includes multiple shift register units. The structure of a traditional shift register unit typically includes a first shift register 10 and a control circuit 30 controlled by a signal from an enable terminal EN. A pulse width of 1H (one row period) can be directly controlled by the signal from the enable terminal EN. However, with the evolution of pixel technology, the signals controlling the pixels have become more diverse, and the time length has exceeded 1H. This results in some drive output signals at output terminals OUT (e.g., out2, out4 in FIG. 3) having waveforms that cross the transition edges (rising or falling) of the signal en from the enable terminal EN. Consequently, only a portion of the drive output signals at output terminals OUT (e.g., out1, out3 in FIG. 3) can be output correctly, while others (e.g., out2, out4 in FIG. 3) cause abnormal pixel operation.

Taking the traditional shift register unit structure shown in FIG. 1 as an example, a working process is described in conjunction with the timing charts in FIGS. 2 and 3.

Reference sign ot1 indicates a cascade signal at a cascade output terminal OT of a first-level shift register unit, reference sign ot2 indicates a cascade signal at a cascade output terminal OT of a second-level shift register unit, reference sign ot3 indicates a cascade signal at a cascade output terminal OT of a third-level shift register unit, and reference sign ot4 indicates a cascade signal at a cascade output terminal OT of a fourth-level shift register unit. Reference sign en indicates a signal at the enable terminal EN, reference sign out1 indicates a drive signal at a drive output terminal OUT of the first-level shift register unit, reference sign out2 indicates a drive signal at a drive output terminal OUT of the second-level shift register unit, reference sign out3 indicates a drive signal at a drive output terminal OUT of the third-level shift register unit, and reference sign out4 indicates a drive signal at a drive output terminal OUT of the fourth-level shift register unit.

As shown in FIG. 2, during a full-refresh frame, when the signal en at the enable terminal EN is at a high level, a third control transistor M3 and a sixth control transistor M6 are turned on due to the high-level signal. At this time, a signal from the second reference signal terminal VGL can be output to a second control transistor M2 and a fifth control transistor M5. A first control transistor M1, the second control transistor M2, a fourth control transistor M4, the fifth control transistor M5, a seventh control transistor M7, an eighth control transistor M8, a ninth control transistor M9, and a tenth control transistor M10 can be equivalently considered as forming four cascaded inverter structures. This ensures that waveforms of the cascade signals (e.g., signals ot1, ot2, ot3, ot4 in FIG. 2) can be output normally. That is, the drive signals (e.g., signals out1, out2, out3, out4 in FIG. 2) can be output normally.

As shown in FIG. 3, during a partial-refresh frame, at a moment t1 (a rising edge of the signal en from the enable terminal EN), the signal en from the enable terminal EN transitions from low to high. The third control transistor M3 and the sixth control transistor M6 are turned on due to the high-level signal. The signal from the second reference signal terminal VGL can be output to the second control transistor M2 and the fifth control transistor M5. The first control transistor M1, the second control transistor M2, the fourth control transistor M4, and the fifth control transistor M5 form four cascaded inverter structures. Therefore, after the moment t1, the waveforms of the cascade signals can be output, that is the waveforms of the drive signals (e.g., signal out2 in FIG. 2) can be output. Here, the waveform of only the drive signal that crosses the rising edge of the signal en from the enable terminal EN can be output partially.

At a moment t2 (the falling edge of the signal en from the enable terminal EN), the signal en from the enable terminal EN transitions from high to low. Before the transition, the signal at the first node N1 is equivalent to a cascade signal of cascade output terminal OT (high level) in the shift register of the same level. After the transition, the third control transistor M3 and the sixth control transistor M6 are turned off due to the low-level signal. The first control transistor M1, the second control transistor M2, the fourth control transistor M4, and the fifth control transistor M5 can no longer output the signal from the second reference signal terminal VGL, and the inverters cannot operate normally. The seventh control transistor M7 and the eighth control transistor M8 can only operate based on the high-level signal stored at the second capacitor C2 at the first node N1. Consequently, the drive signal (e.g., signal out4 in FIG. 3) cannot change and continuously outputs a high-level signal. This means that the drive signal (e.g., out4) crossing the falling edge of the signal en from the enable terminal EN fails to have a waveform with a falling edge.

Based on the above issues, the disclosure provides the following solutions.

Figure 4:
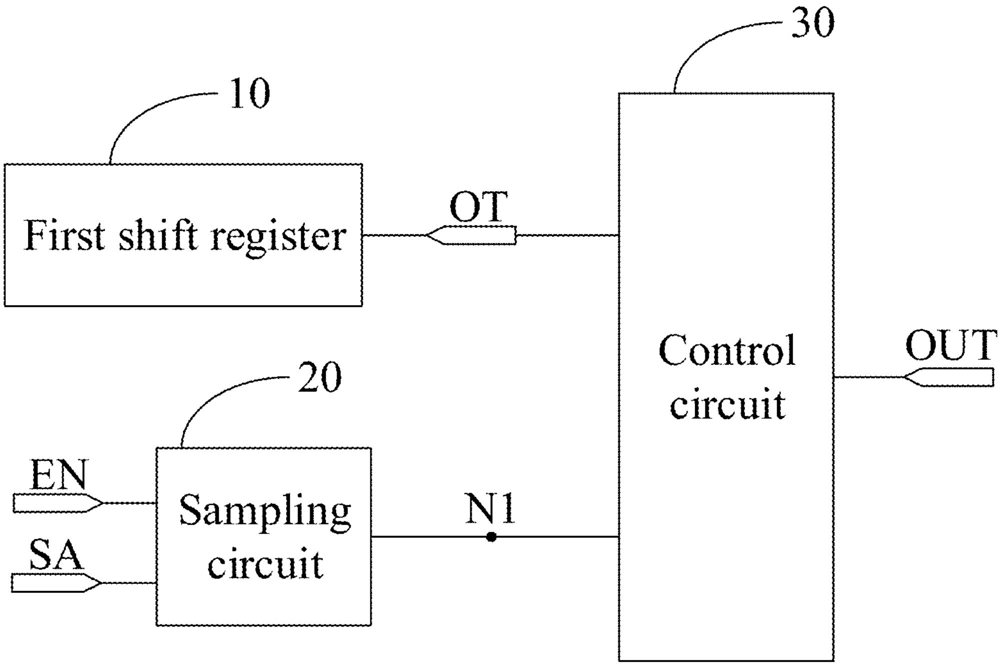
FIG. 4 shows a schematic diagram of some of a structure of a shift register unit according to embodiments of the disclosure.

In embodiments of the disclosure, a shift register unit, as shown in FIG. 4, includes: a first shift register 10, a sampling circuit 20, and a control circuit 30.

The first shift register 10 is configured to output a cascade signal via a cascade output terminal OT.

The sampling circuit 20 is coupled to a first node N1 and is configured to provide a signal from an enable terminal EN to the first node N1 in response to a signal from a sampling control terminal SA.

The control circuit 30 is coupled to the cascade output terminal OT and the first node N1, and is configured to, in response to a signal at the first node N1, output a gate scan signal with a same timing diagram as the cascade signal via a drive output terminal OUT, or output a gate off signal via the drive output terminal OUT.

In the embodiments of the disclosure, based on the cooperation of the first shift register, sampling circuit, and control circuit, not only can row-by-row data refresh be achieved across the entire pixel region of the display panel, but partial regions of the display panel can also be selectively refreshed. This allows only the selected local region to be refreshed during a partial data refresh, enabling the local region to operate at a high refresh rate, while the other regions are not refreshed, thus enabling a low refresh rate for the other regions, which minimizes driving power consumption.

Furthermore, during a partial data refresh of the display screen, the sampling circuit ensures that the control circuit can output correct signals in a next display frame, allowing the display panel to function normally without outputting erroneous signals caused by changes in the signal from the enable terminal EN.

It should be noted that the signal from the enable terminal is provided by an integrated circuit (IC) chip. The IC chip calculates the sub-pixel refresh frequency for each row of the display panel and the waveform requirements for the signal from the enable terminal in each frame based on the refresh frequency demands for different regions of the entire device.

In some embodiments of the disclosure, as shown in FIG. 4, the sampling circuit 20 is further configured to provide the signal from the enable terminal EN to the first node N1 in response to a signal at the sampling control terminal SA during a sampling phase.

The sampling phase is between a start moment of an active level of a cascade signal of a previous-level shift register unit and a start moment of an active level of a cascade signal of a current shift register unit.

Figure 5:
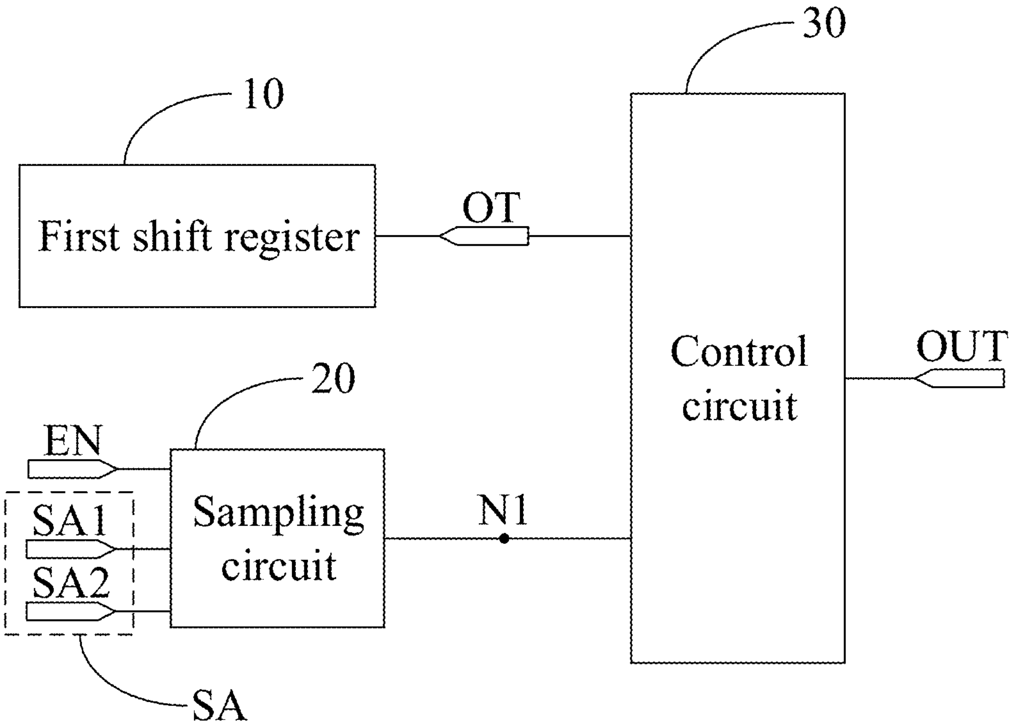
FIG. 5 shows another schematic diagram of some of a structure of a shift register unit according to embodiments of the disclosure.

In some embodiments, as shown in FIG. 5, the sampling control terminal SA includes a first sampling control terminal SA1 and a second sampling control terminal SA2. The sampling circuit 20 is further configured to provide the signal from the enable terminal EN in response to both signals from the first sampling control terminal SA1 and the second sampling control terminal SA2.

Figure 6:
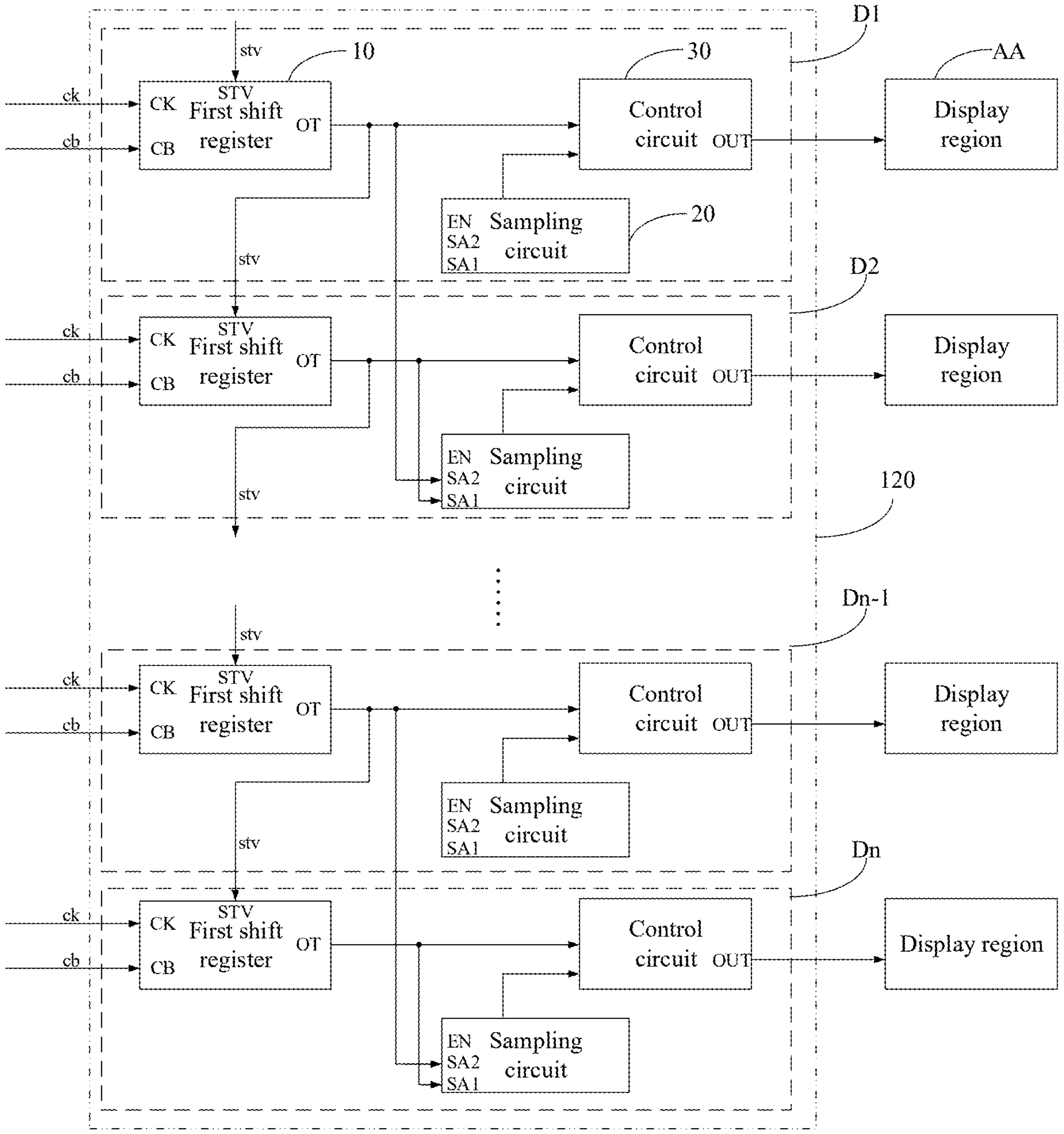
FIG. 6 shows another schematic diagram of some of a structure of a shift register unit according to embodiments of the disclosure.

In some embodiments, as shown in FIG. 6, the first sampling control terminal SA1 of the current-level shift register unit is coupled to a cascade output terminal OT of the current-level shift register unit, and the second sampling control terminal SA2 of the current-level shift register unit is coupled to a cascade output terminal OT of a previous-level shift register unit. The sampling circuit 20 is further configured to provide the signal from the enable terminal EN to the first node N1 in response to the cascade signal from the current-level shift register unit and the cascade signal of the previous-level shift register unit during the sampling phase.

For example, as shown in FIG. 6, a first sampling control terminal SA1 of a second-level shift register unit D2 is coupled to a cascade output terminal OT of the second-level shift register unit D2, and a second sampling control terminal SA2 of the second-level shift register unit D2 is coupled to a cascade output terminal OT of the first-level shift register unit D1. Similarly, a first sampling control terminal SA1 of a nth-level shift register unit Dn is coupled to a cascade output terminal OT of the nth-level shift register unit Dn, and a second sampling control terminal SA2 of the nth-level shift register unit Dn is coupled to a cascade output terminal OT of a (n−1)th-level shift register unit Dn−1.

In some embodiments, as shown in FIG. 6, a first clock signal terminal CK of the first shift register 10 receives a first clock signal ck, a second clock signal terminal CB receives a second clock signal cb, and a frame start signal terminal STV receives a frame start signal stv.

In some embodiments, the first-level shift register unit D1 corresponds to a part of the display region AA, the second-level shift register unit D2 corresponds to a part of the display region AA, and so on. The (n−1)th-level shift register unit Dn−1 corresponds to a part of the display region AA, and the nth-level shift register unit Dn corresponds to a part of the display region AA.

Figure 7:
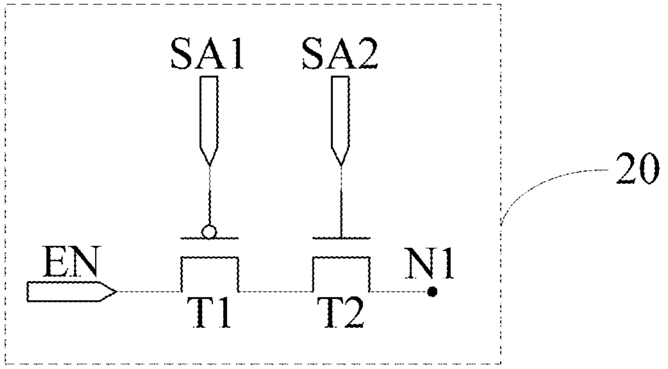
FIG. 7 shows another schematic diagram of some of a structure of a shift register unit according to embodiments of the disclosure.

In some embodiments, as shown in FIG. 7, the sampling circuit 20 includes a first transistor T1 and a second transistor T2. A gate of the first transistor T1 is coupled to the first sampling control terminal SA1, a first terminal of the first transistor T1 is coupled to the enable terminal EN, a second terminal of the first transistor T1 is coupled to a first terminal of the second transistor T2, a gate of the second transistor T2 is coupled to the second sampling control terminal SA2, and a second terminal of the second transistor T2 is coupled to the first node N1.

Figure 8:
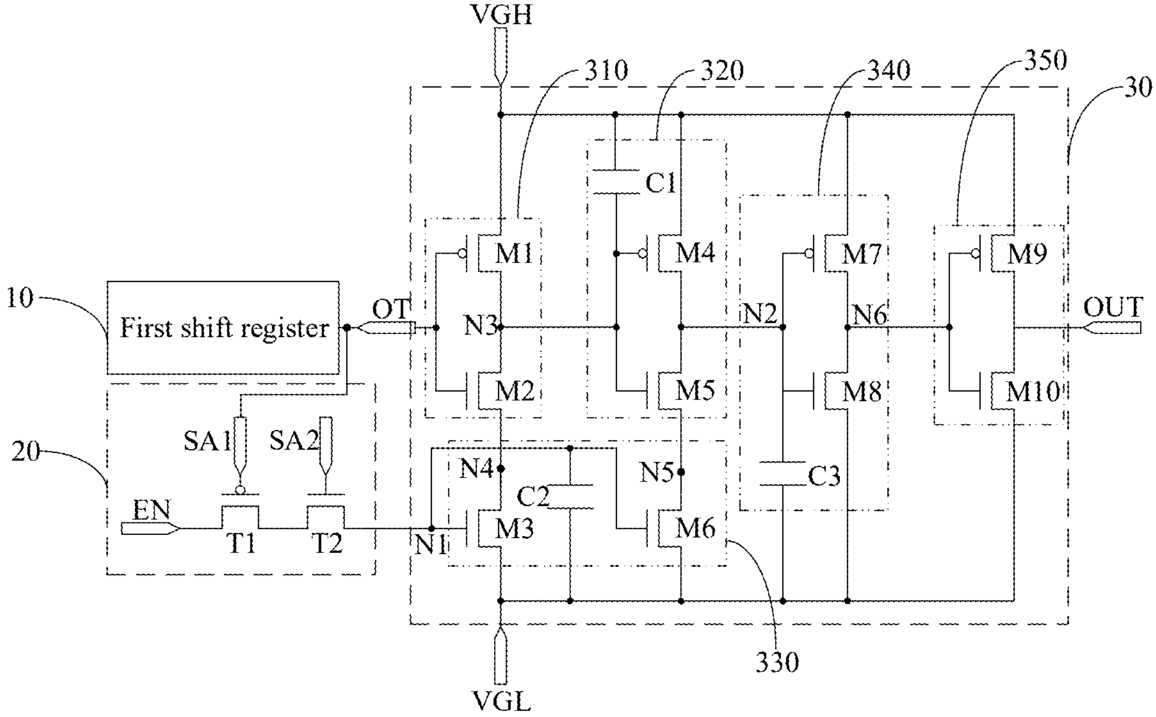
FIG. 8 shows another schematic diagram of some of a structure of a shift register unit according to embodiments of the disclosure.

In some embodiments, as shown in FIG. 8, the control circuit 30 includes a first control sub-circuit 310, a second control sub-circuit 320, a third control sub-circuit 330, a fourth control sub-circuit 340, and a fifth control sub-circuit 350.

The first control sub-circuit 310 is configured to, in response to the cascade signal from the cascade terminal OT, provide a signal from a first reference terminal VGH to a third node N3, or provide a signal at a fourth node N4 to the third node N3.

The second control sub-circuit 320 is configured to, in response to the signal at the third node N3, provide the signal from the first reference terminal VGH to the second node N2, or provide a signal at a fifth node N5 to the second node N2.

The third control sub-circuit 330 is configured to, in response to the signal from the first node N1, provide a signal from a second reference terminal VGL to the fourth node N4 and the fifth node N5.

The fourth control sub-circuit 340 is configured to, in response to the signal from the second node N2, provide the signal from the first reference terminal VGH to a sixth node N6, or provide the signal from the second reference terminal VGL to the sixth node N6.

The fifth control sub-circuit 350 is configured to, in response to a signal at the sixth node N6, provide the signal from the first reference terminal VGH to the drive output terminal OUT, or provide the signal from the second reference terminal VGL to the drive output terminal OUT.

In some embodiments, as shown in FIG. 8, the first control sub-circuit 310 includes a first control transistor M1 and a second control transistor M2. A gate of the first control transistor M1 is coupled to the cascade output terminal OT, a first terminal of the first control transistor M1 is coupled to the first reference terminal VGH, and a second terminal of the first control transistor M1 is coupled to the third node N3. A gate of the second control transistor M2 is coupled to the cascade output terminal OT, a first terminal of the second control transistor M2 is coupled to the third node N3, and a second terminal of the second control transistor M2 is coupled to the fourth node N4.

In some embodiments, as shown in FIG. 8, the second control sub-circuit 320 includes a fourth control transistor M4, a fifth control transistor M5, and a first capacitor C1. A gate of the fourth control transistor M4 is coupled to the third node N3, a first terminal of the fourth control transistor M4 is coupled to the first reference terminal VGH, and a second terminal of the fourth control transistor M4 is coupled to the second node N2. A gate of the fifth control transistor M5 is coupled to the third node N3, a first terminal of the fifth control transistor M5 is coupled to the second node N2, and the second terminal of the fifth control transistor M5 is coupled to the fifth node N5. A first electrode of the first capacitor C1 is coupled to the first reference terminal VGH, and a second electrode of the first capacitor C1 is coupled to the gate of the fourth control transistor M4.

In some embodiments the disclosure, as shown in FIG. 8, the third control sub-circuit 330 includes: a third control transistor M3, a sixth control transistor M6, and a second capacitor C2. A gate of the third control transistor M3 is coupled to the first node N1, a first terminal of M3 is coupled to the fourth node N4, and a second terminal of the third control transistor M3 is coupled to the second reference signal terminal VGL. A gate of the sixth control transistor M6 is coupled to the first node N1, a first terminal of the sixth control transistor M6 is coupled to the fifth node N5, and a second terminal of the sixth control transistor M6 is coupled to the second reference signal terminal VGL. A first electrode of the second capacitor C2 is coupled to the first node N1, and a second electrode of the second capacitor C2 is coupled to the second reference signal terminal VGL.

Here, the second capacitor C2 provides a voltage stabilization effect. If the inverter does not function properly, the second capacitor C2 can ensure that the voltage at the first node N1 remains unaffected, maintaining a normal state.

In some embodiments the disclosure, as shown in FIG. 8, the fourth control sub-circuit 340 includes: a seventh control transistor M7, an eighth control transistor M8, and a third capacitor C3. A gate of the seventh control transistor M7 is coupled to the second node N2, a first terminal of the seventh control transistor M7 is coupled to the first reference signal terminal VGH, and a second terminal of the seventh control transistor M7 is coupled to the sixth node N6. A gate of the eighth control transistor M8 is coupled to the second node N2, a first terminal of the eighth control transistor M8 is coupled to the sixth node N6, and a second terminal of the eighth control transistor M8 is coupled to the second reference signal terminal VGL. A first electrode of the third capacitor C3 is coupled to the second node N2, and a second terminal of the third capacitor C3 is coupled to the second reference signal terminal VGL.

In some embodiments the disclosure, as shown in FIG. 8, the fifth control sub-circuit 350 includes: a ninth control transistor M9 and a tenth control transistor M10. A gate of the ninth control transistor M9 is coupled to the sixth node N6, a first terminal of the ninth control transistor M9 is coupled to the first reference signal terminal VGH, and a second terminal of the ninth control transistor M9 is coupled to the drive output terminal OUT. A gate of the tenth control transistor M10 is coupled to the sixth node N6, a first terminal of the tenth control transistor M10 is coupled to the drive output terminal OUT, and the second terminal of the tenth control transistor M10 is coupled to the second reference signal terminal VGL.

Illustratively, as shown in FIG. 8, some of the transistors can be P-type transistors while others can be N-type transistors. For example, the first transistor T1, the first control transistor M1, the fourth control transistor M4, the seventh control transistor M7, and the ninth control transistor M9 are P-type transistors. The second transistor T2, the second control transistor M2, the third control transistor M3, the fifth control transistor M5, the sixth control transistor M6, the eighth control transistor M8, and the tenth control transistor M10 are N-type transistors. Furthermore, N-type transistors are turned on under high-level signals and turned off under low-level signals, while P-type transistors are turned off under high-level signals and turned on under low-level signals.

Figure 9:
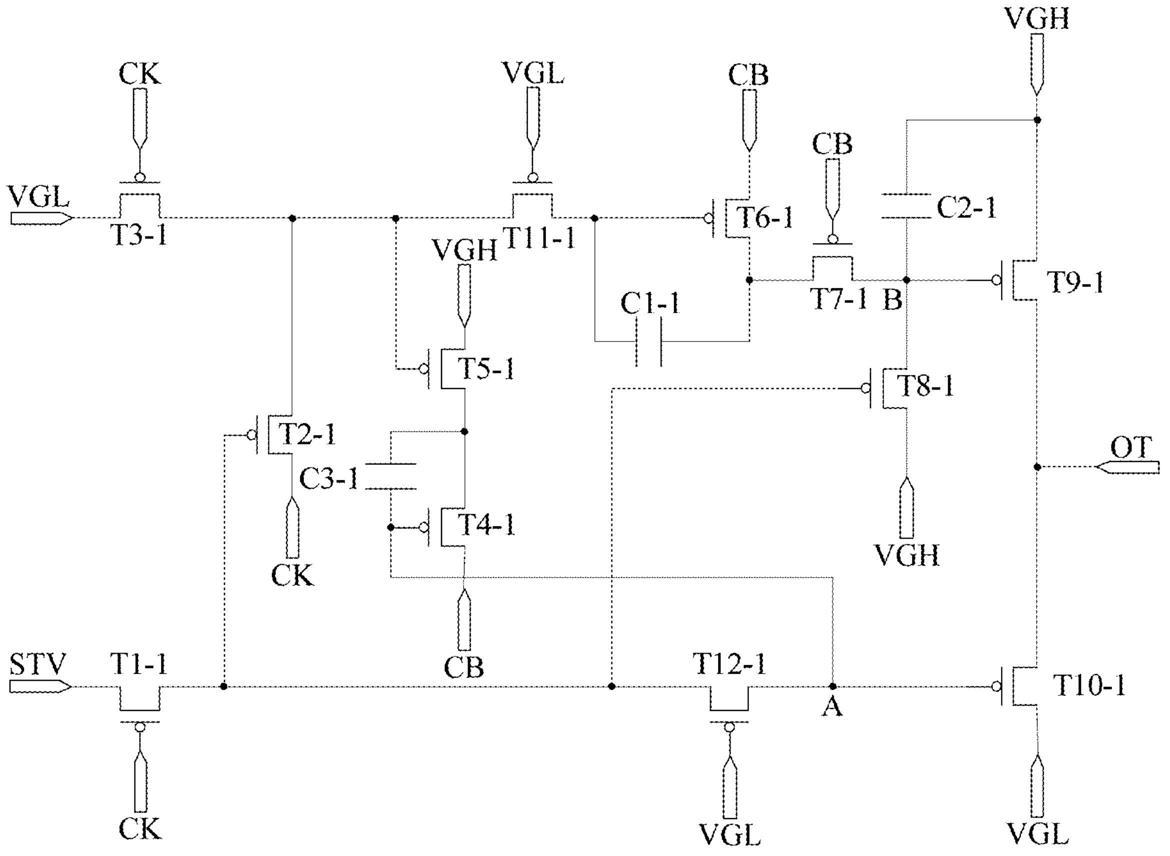
FIG. 9 shows another schematic diagram of some of a structure of a shift register unit according to embodiments of the disclosure.

Illustratively, as shown in FIG. 9, the first shift register 10 includes: a first first-number transistor T1-1, a second first-number transistor T2-1, a third first-number transistor T3-1, a fourth first-number transistor T4-1, a fifth first-number transistor T5-1, a sixth first-number transistor T6-1, a seventh first-number transistor T7-1, an eighth first-number transistor T8-1, a ninth first-number transistor T9-1, a tenth first-number transistor T10-1, an eleventh first-number transistor T11-1, a twelfth first-number transistor T12-1, a first first-level capacitor C1-1, a second first-level capacitor C2-1, and a third first-level capacitor C3-1. Here, a gate of the first first-number transistor T1-1 is coupled to the first clock signal terminal CK, a first terminal of the first first-number transistor T1-1 is coupled to the frame start signal terminal STV, and the second terminal of the first first-number transistor T1-1 is coupled to a gate of the second first-number transistor T2-1. a first terminal of the second first-number transistor T2-1 is coupled to a second terminal of the third first-number transistor T3-1, and a second terminal of the second first-number transistor T2-1 is coupled to the first clock signal terminal CK. A gate of the third first-number transistor T3-1 is coupled to the first clock signal terminal CK, the first terminal of the third first-number transistor T3-1 is coupled to the second reference signal terminal VGL. A gate of the fourth first-number transistor T4-1 is coupled to a pull-down node A, a first terminal of the fourth first-number transistor T4-1 is coupled to a second terminal of the fifth first-number transistor T5-1, and a second terminal of the fourth first-number transistor T4-1 is coupled to the second clock signal terminal CB. A gate of the fifth first-number transistor T5-1 is coupled to the second terminal of the third first-number transistor T3-1, the first terminal of the fifth first-number transistor T5-1 is coupled to the first reference signal terminal VGH. A gate of the sixth first-number transistor T6-1 is coupled to a second terminal of the eleventh first-number transistor T11-1, a first terminal of the sixth first-number transistor T6-1 is coupled to the second clock signal terminal CB, and a second terminal of the sixth first-number transistor T6-1 is coupled to the first terminal of the seventh first-number transistor T7-1. A gate of the seventh first-number transistor T7-1 is coupled to the second clock signal terminal CB, and the second terminal of the seventh first-number transistor T7-1 is coupled to the pull-up node B. A gate of the eighth first-number transistor T8-1 is coupled to the second terminal of the first first-number transistor T1-1, the first terminal of the eighth first-number transistor T8-1 is coupled to the pull-up node B, and the second terminal of the eighth first-number transistor T8-1 is coupled to the first reference signal terminal VGH. A gate of the ninth first-number transistor T9-1 is coupled to the pull-up node B, the first terminal of the ninth first-number transistor T9-1 is coupled to the first reference signal terminal VGH, and the second terminal of the ninth first-number transistor T9-1 is coupled to the cascade output terminal OT. A gate of the tenth first-number transistor T10-1 is coupled to the pull-down node A, a first terminal of the tenth first-number transistor T10-1 is coupled to the cascade output terminal OT, and the second terminal of the tenth first-number transistor T10-1 is coupled to the second reference signal terminal VGL. A gate of the eleventh first-number transistor T11-1 is coupled to the second reference signal terminal VGL, the first terminal of the eleventh first-number transistor T11-1 is coupled to the second terminal of the third first-number transistor T3-1, and the second terminal of the eleventh first-number transistor T11-1 is coupled to the gate of the sixth first-number transistor T6-1. A gate of the twelfth first-number transistor T12-1 is coupled to the second reference signal terminal VGL, a first terminal of the twelfth first-number transistor T12-1 is coupled to the second terminal of the first first-number transistor T1-1, and a second terminal of the twelfth first-number transistor T12-1 is coupled to the pull-down node A. A first electrode of the first first-level capacitor C1-1 is coupled to the second terminal of the eleventh first-number transistor T11-1, and a second electrode of the first first-level capacitor C1-1 is coupled to the second terminal of the sixth first-number transistor T6-1. A first electrode of the second first-level capacitor C2-1 is coupled to the first reference signal terminal VGH, and a second electrode of the second first-level capacitor C2-1 is coupled to the pull-up node B. A first electrode of the third first-level capacitor C3-1 is coupled to the second terminal of the fifth first-number transistor T5-1, and a second electrode of the third first-level capacitor C3-1 is coupled to the pull-down node A.

Figure 10:
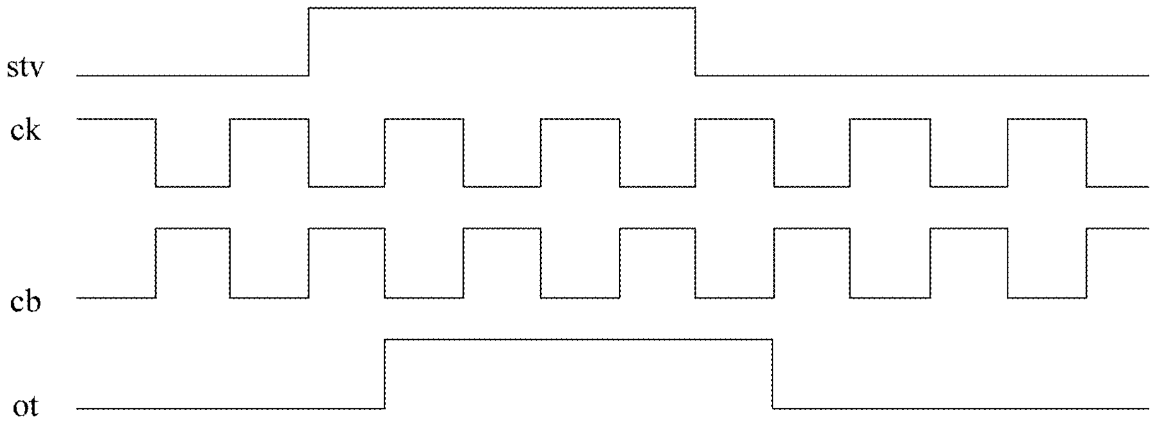
FIG. 10 shows a timing chart for some signals according to embodiments of the disclosure.

Exemplarily, as shown in FIG. 10, reference sign stv indicates the signal from the frame start signal terminal, reference sign ck indicates the signal from the first clock signal terminal CK, reference sign cb indicates the signal from the second clock signal terminal CB, and reference sign ot indicates the signal from the cascade signal terminal OT.

Exemplarily, to simplify the fabrication process, all transistors can be P-type transistors; alternatively, all transistors can also be N-type transistors. This is not specifically limited herein.

Exemplarily, the first reference signal terminal VGH can be configured to load a constant first reference voltage vgh, and the first reference voltage vgh is generally a high voltage. Similarly, the second reference signal terminal VGL can load a constant second reference voltage vgl, and the second reference voltage vgl is generally a low voltage. In practical applications, the specific values of the first reference voltage vgh and the second reference voltage vgl can be designed and determined based on the actual application environment, without specific limitation herein.

It should be noted that the transistors mentioned in the above embodiments the disclosure can be thin-film transistors (TFTs, Thin Film Transistor) or metal-oxide-semiconductor field-effect transistors (MOSFETs, Metal Oxide Semiconductor). There is no specific limitation herein. In specific implementations, depending on the type of transistor and the input signals, the first electrode of the aforementioned transistors can serve as its source, and the second electrode as its drain; alternatively, the first electrode can serve as its drain, and the second electrode as its source. No specific distinction is made here.

It should be noted that the structure of the above-described first shift register is merely an example. In practical applications, other structures can also be used, and there is no specific limitation herein.

Figure 11:
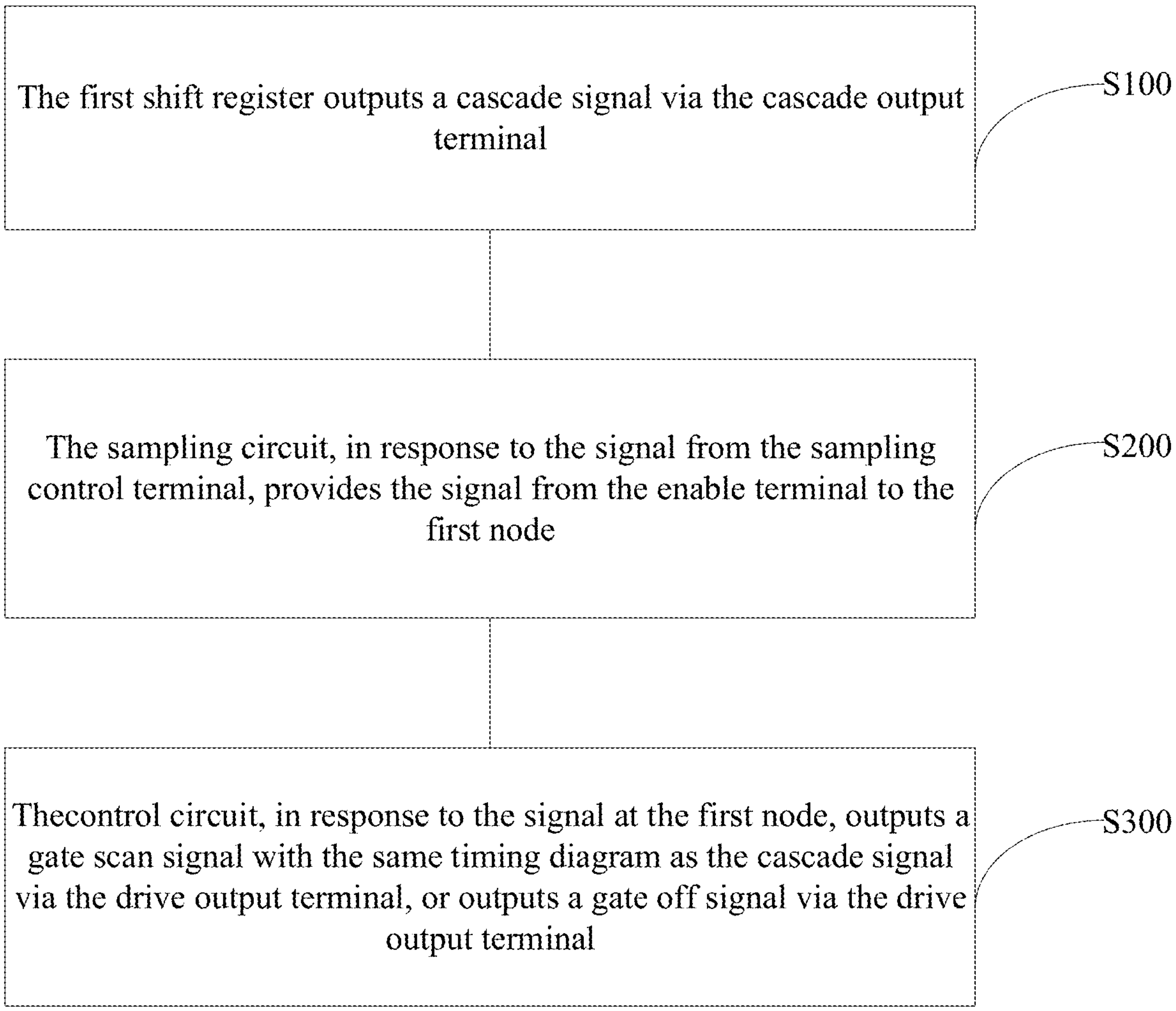
FIG. 11 shows a schematic flowchart of a drive method according to embodiments of the disclosure.

The drive method for the shift register unit according to embodiments of the disclosure, as shown in FIG. 11, includes the following steps:

S100: the first shift register outputs a cascade signal via the cascade output terminal;

S200: the sampling circuit, in response to the signal from the sampling control terminal, provides the signal from the enable terminal to the first node;

S300: the control circuit, in response to the signal at the first node, outputs a gate scan signal with the same timing diagram as the cascade signal via the drive output terminal, or outputs a gate off signal via the drive output terminal.

Figure 12:
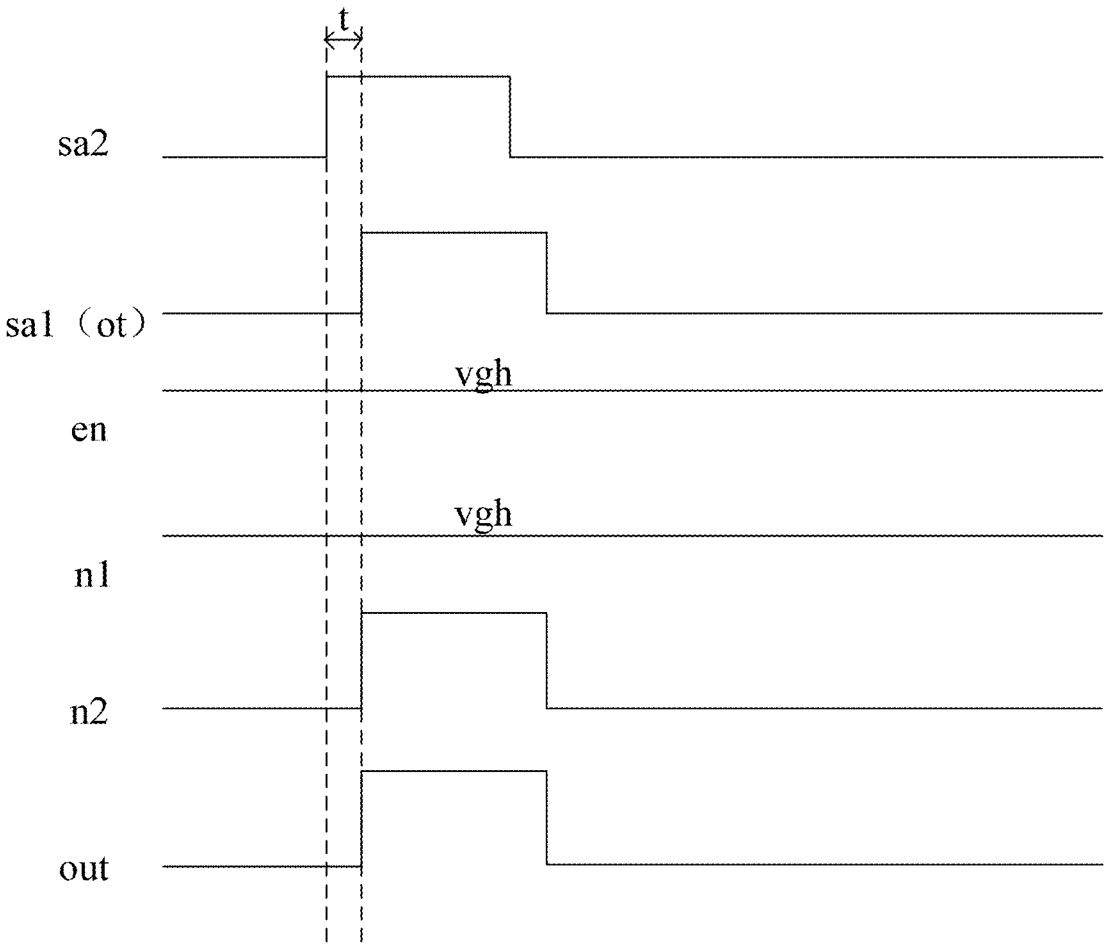
FIG. 12 shows another timing chart for some signals according to embodiments of the disclosure.

The working process of the above shift register unit according to embodiments of the disclosure is described below using the shift register unit structure shown in FIG. 8 as an example, in conjunction with the signal timing chart shown in FIG. 12.

As shown in FIGS. 12 to 15, reference sign sa1 (ot) indicates the signal from the first sampling control terminal SA1 (cascade signal terminal OT), reference sign sa2 indicates the signal from the second sampling control terminal SA2, reference sign en indicates the signal from the enable terminal, reference sing n1 indicates the signal at the first node N1, reference sign n2 indicates the signal at the second node N2, and reference sing out indicates the signal at the drive output terminal OUT. Herein, reference sign vgh indicates the first reference voltage, and reference sign vgl indicates the second reference voltage.

In a full-refresh frame, during the sampling phase t, the first transistor T1 is turned on under the control of the low-level signal from the first sampling control terminal SA1, and the second transistor T2 is turned on under the control of the high-level signal from the second sampling control terminal SA2. The first transistor T1 and the second transistor T2 transmit the high-level signal from the enable terminal EN to the first node N1. The control circuit 30, in response to the signal at the first node N1, outputs a gate scan signal with the same timing diagram as the cascade signal ot via the drive output terminal OUT.

Figure 13:
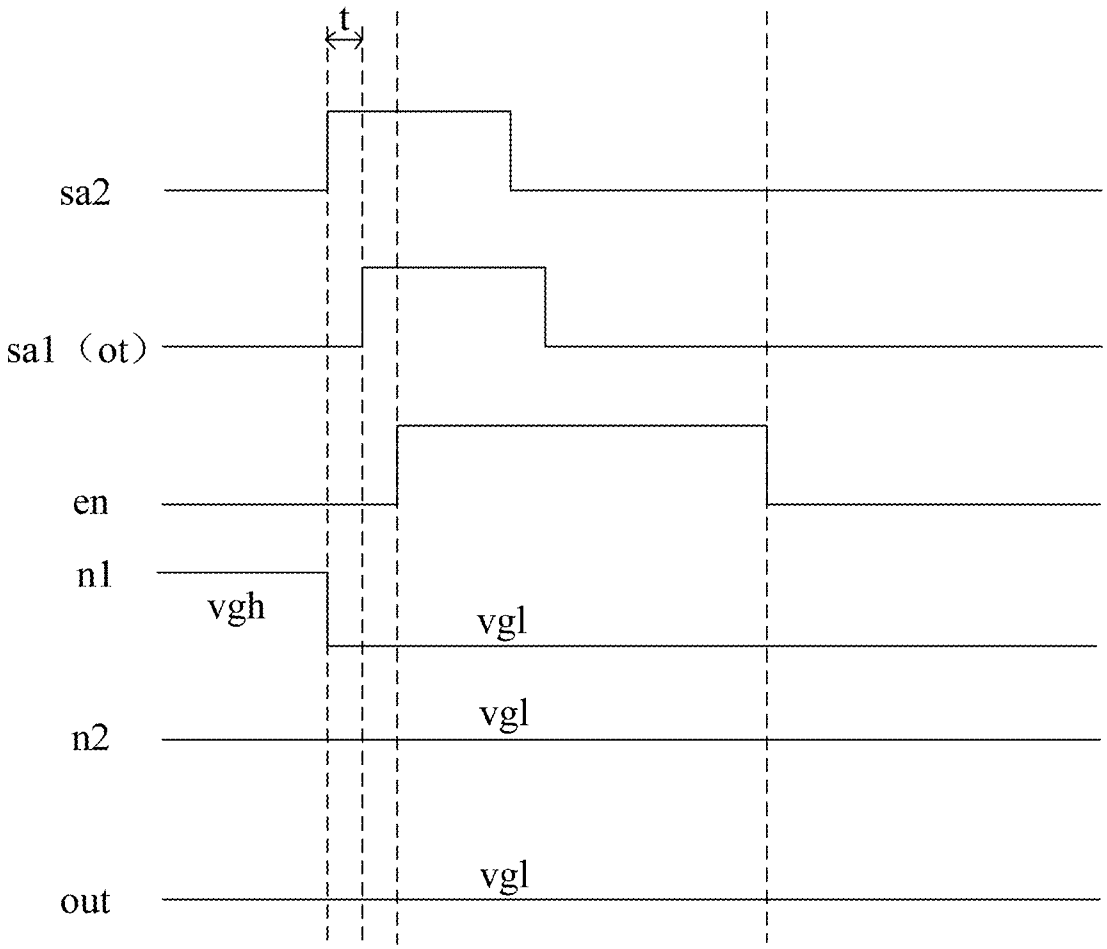
FIG. 13 shows another timing chart for some signals according to embodiments of the disclosure.

The working process of the above shift register unit according to embodiments of the disclosure is further described below using the shift register unit structure shown in FIG. 8 as an example, in conjunction with the signal timing chart shown in FIG. 13.

In a partial-refresh frame, during the sampling phase t, the first transistor T1 is turned on under the control of the low-level signal from the first sampling control terminal SA1, and the second transistor T2 is turned on under the control of the high-level signal from the second sampling control terminal SA2. The first transistor T1 and the second transistor T2 transmit the low-level signal from the enable terminal EN to the first node N1. The control circuit 30, in response to the signal at the first node N1, outputs a gate off signal via the drive output terminal OUT.

Figure 14:
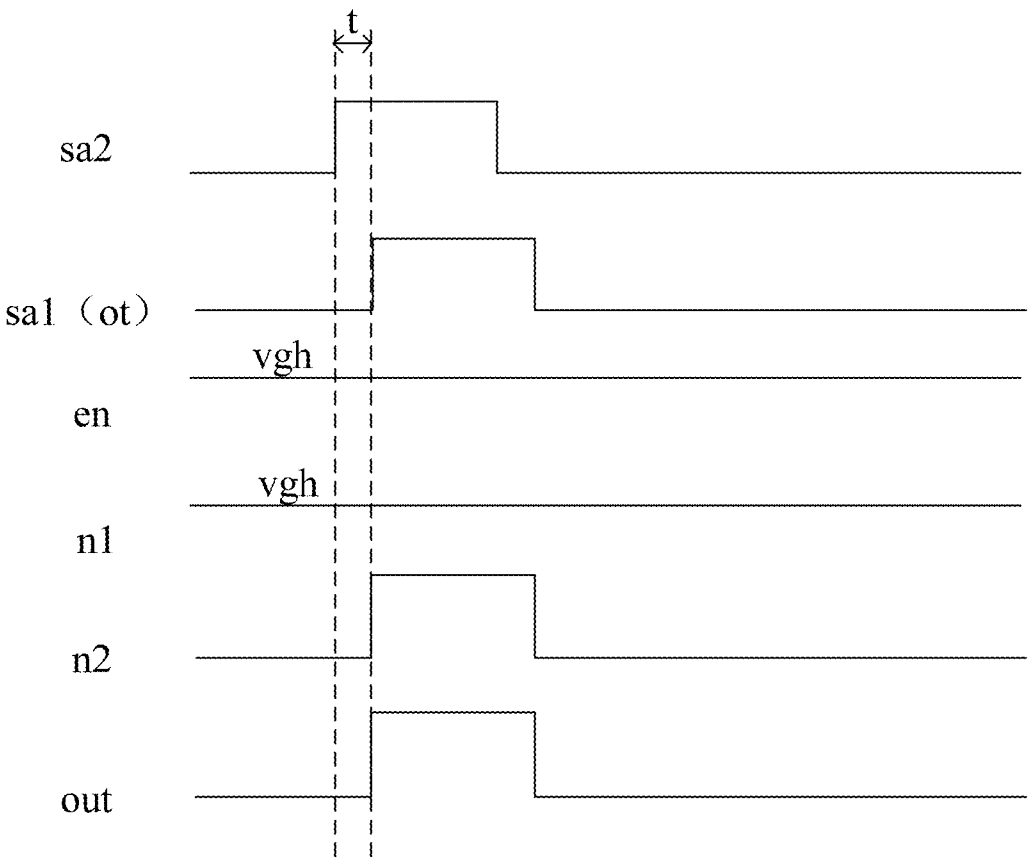
FIG. 14 shows another timing chart for some signals according to embodiments of the disclosure.

The working process of the above shift register unit according to embodiments of the disclosure is further described below using the shift register unit structure shown in FIG. 8 as an example, in conjunction with the signal timing chart shown in FIG. 14.

In a full-refresh frame, during the sampling phase t, the first transistor T1 is turned on under the control of the low-level signal from the first sampling control terminal SA1, and the second transistor T2 is turned on under the control of the high-level signal from the second sampling control terminal SA2. The first transistor T1 and the second transistor T2 transmit the high-level signal from the enable terminal EN to the first node N1. The control circuit 30, in response to the signal at the first node N1, outputs a gate scan signal with the same timing diagram as the cascade signal ot via the drive output terminal OUT.

Figure 15:
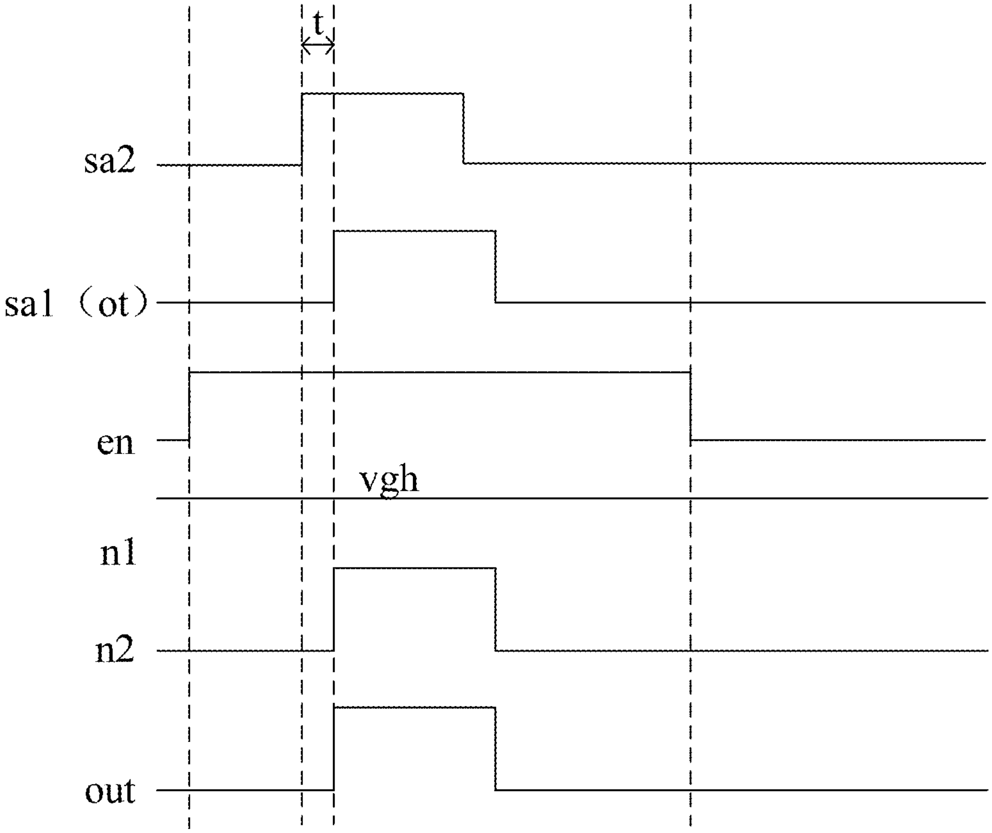
FIG. 15 shows another timing chart for some signals according to embodiments of the disclosure.

The working process of the above shift register unit according to embodiments of the disclosure is further described below using the shift register unit structure shown in FIG. 8 as an example, in conjunction with the signal timing chart shown in FIG. 15.

In a partial-refresh frame, during the sampling phase t, the first transistor T1 is turned on under the control of the low-level signal from the first sampling control terminal SA1, and the second transistor T2 is turned on under the control of the high-level signal from the second sampling control terminal SA2. The first transistor T1 and the second transistor T2 transmit the high-level signal at the enable terminal EN to the first node N1. The control circuit 30, in response to the signal at the first node N1, outputs a gate scan signal with the same timing diagram as the cascade signal ot via the drive output terminal OUT.

Figure 16:
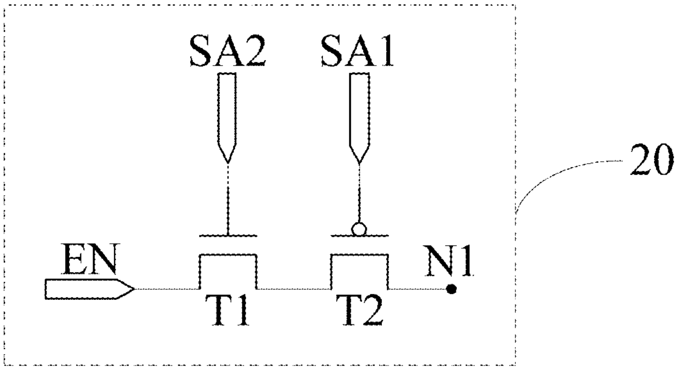
FIG. 16 shows another schematic diagram of some of a structure of a shift register unit according to embodiments of the disclosure.
Figure 17:
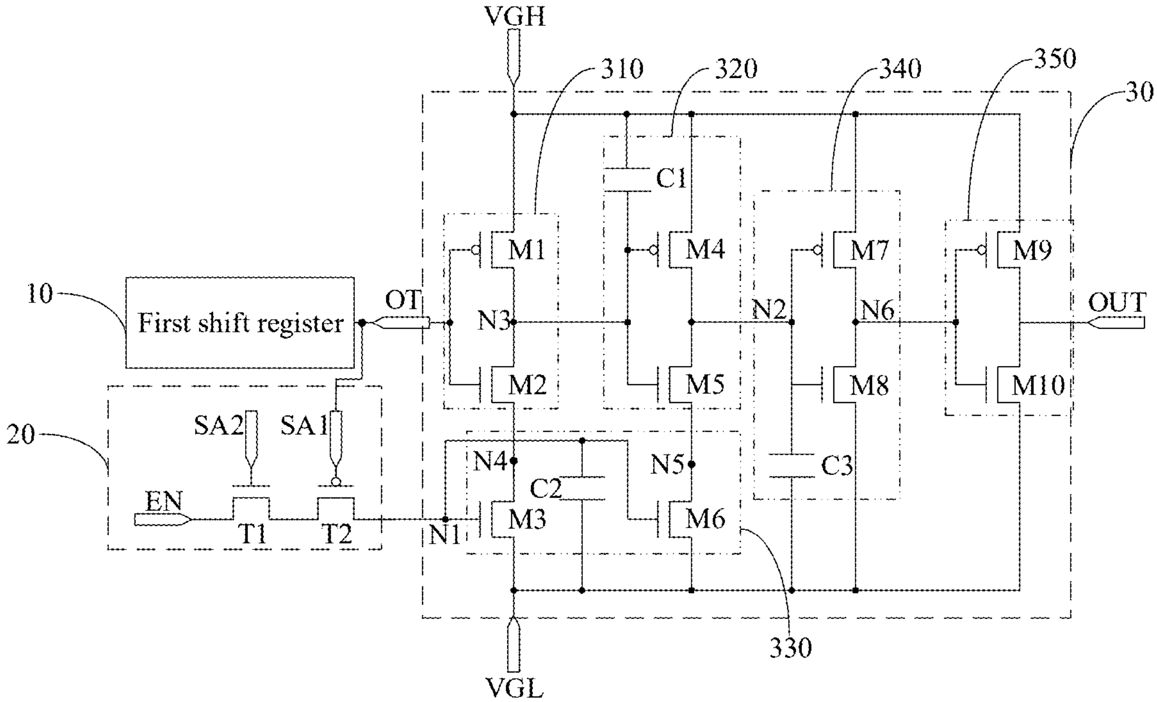
FIG. 17 shows another schematic diagram of some of a structure of a shift register unit according to embodiments of the disclosure.

Embodiments of the disclosure also provide other schematic diagrams of shift register unit structures, as shown in FIGS. 16 and 17, which are variations of the implementations described above. Only the differences between the embodiment and the above embodiments are described below, and the similarities are not repeated herein.

In some other embodiments the disclosure, as shown in FIGS. 16 and 17, the sampling circuit 20 includes the first transistor T1 and the second transistor T2. Herein, a gate of the first transistor T1 is coupled to the second sampling control terminal SA2, a first terminal of the first transistor T1 is coupled to the enable terminal EN, a second terminal of the first transistor T1 is coupled to a first terminal of the second transistor T2, a gate of the second transistor T2 is coupled to the first sampling control terminal SA1, and a second terminal of the second transistor T2 is coupled to the first node N1.

The working process of the above shift register unit according to embodiments of the disclosure is described below using the shift register unit structure shown in FIG. 17 as an example, in conjunction with the signal timing diagram shown in FIG. 12.

In a full-refresh frame, during the sampling phase t, the second transistor T2 is turned on under the control of the low-level signal from the first sampling control terminal SA1, and the first transistor T1 is turned on under the control of the high-level signal from the second sampling control terminal SA2. The first transistor T1 and the second transistor T2 transmit the high-level signal from the enable terminal EN to the first node N1. The control circuit 30, in response to the signal at the first node N1, outputs a gate scan signal with the same timing diagram as the cascade signal ot via the drive output terminal OUT.

Taking the structure of the shift register unit shown in FIG. 17 as an example, the working process of the shift register unit according to embodiments of the disclosure is described with reference to the signal timing chart shown in FIG. 13.

In a partial refresh frame, in the sampling phase t, the second transistor T2 is turned on under the control of the low-level signal from the first sampling control terminal SA1, and the first transistor T1 is turned on under the control of the high-level signal from the second sampling control terminal SA2. The first transistor T1 and the second transistor T2 transmit a low-level signal from the enable terminal EN to the first node N1. The control circuit 30, in response to the signal at the first node N1, outputs a gate off signal via the drive output terminal OUT.

Taking the structure of the shift register unit shown in FIG. 17 as an example again, the working process of the shift register unit according to the embodiments of the disclosure is described with reference to the signal timing chart shown in FIG. 14.

In the full refresh frame, during the sampling phase t, the second transistor T2 is turned on under the control of the low-level signal from the first sampling control terminal SA1, and the first transistor T1 is turned on under the control of the high-level signal from the second sampling control terminal SA2. The first transistor T1 and the second transistor T2 transmit a high-level signal from the enable terminal EN to the first node N1. The control circuit 30, in response to the signal at the first node N1, outputs a gate scan signal with the same timing diagram as the cascade signal ot via the drive output terminal OUT.

Taking the structure of the shift register unit shown in FIG. 17 as an example again, the working process of the shift register unit according to embodiments of the disclosure is described with reference to the signal timing chart shown in FIG. 15.

In the partial refresh frame, during the sampling phase t, the second transistor T2 is turned on under the control of the low-level signal from the first sampling control terminal SA1, and the first transistor T1 is turned on under the control of the high-level signal from the second sampling control terminal SA2. The first transistor T1 and the second transistor T2 transmit a high-level signal from the enable terminal EN to the first node N1. The control circuit 30, in response to the signal at the first node N1, outputs a gate scan signal with the same timing diagram as the cascade signal ot via the drive output terminal OUT.

Figure 18:
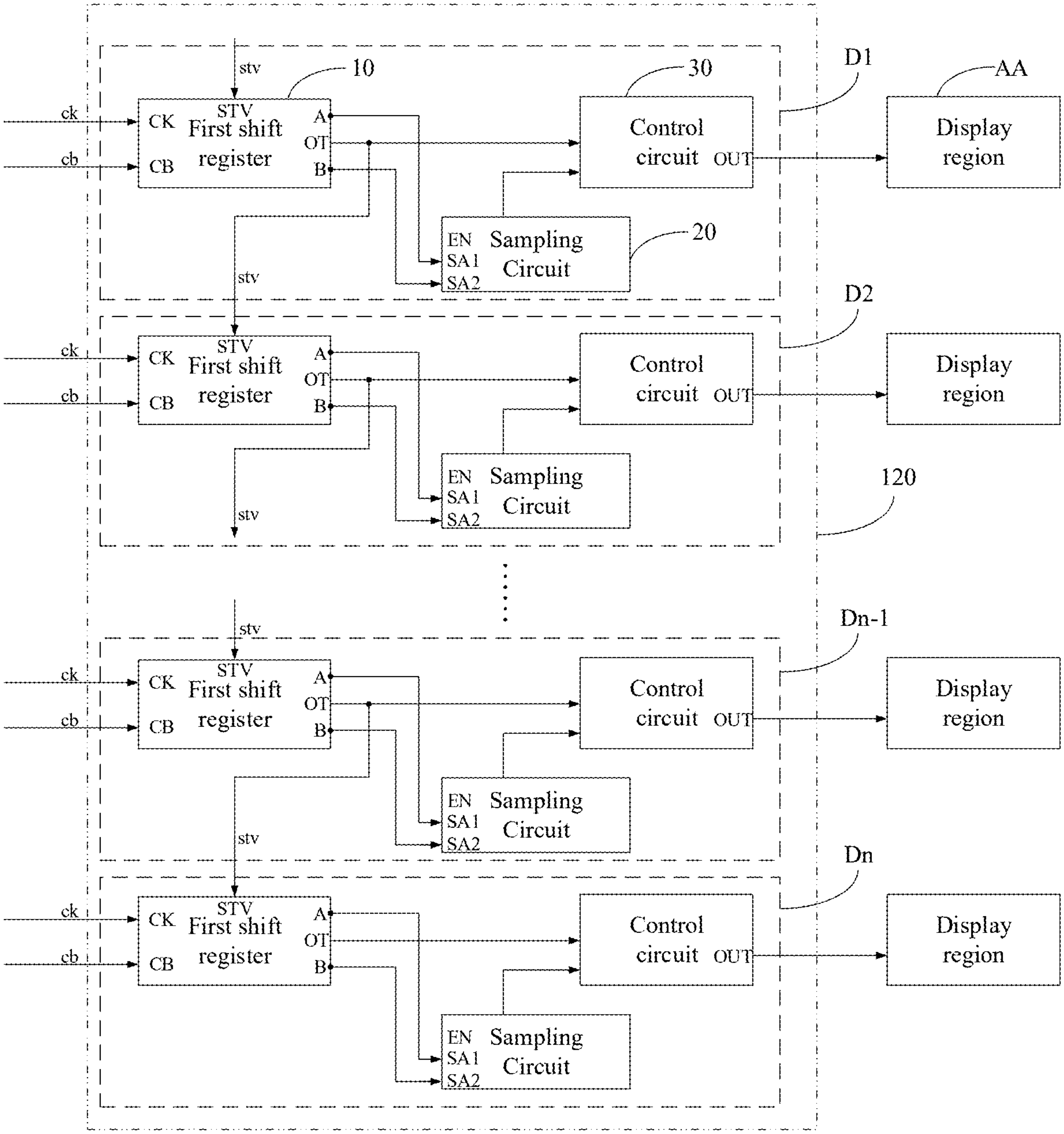
FIG. 18 shows another schematic diagram of some of a structure of a shift register unit according to embodiments of the disclosure.
Figure 19:
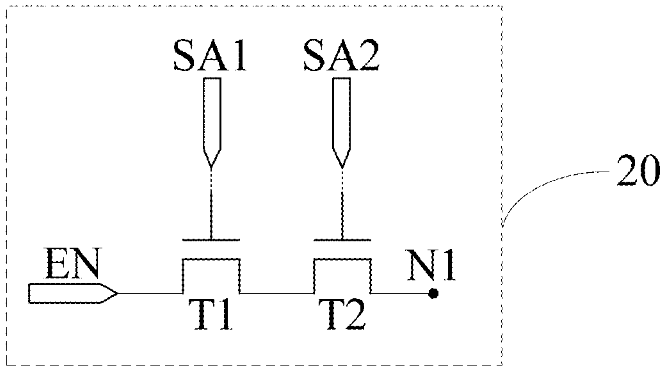
FIG. 19 shows another schematic diagram of some of a structure of a shift register unit according to embodiments of the disclosure.
Figure 20:
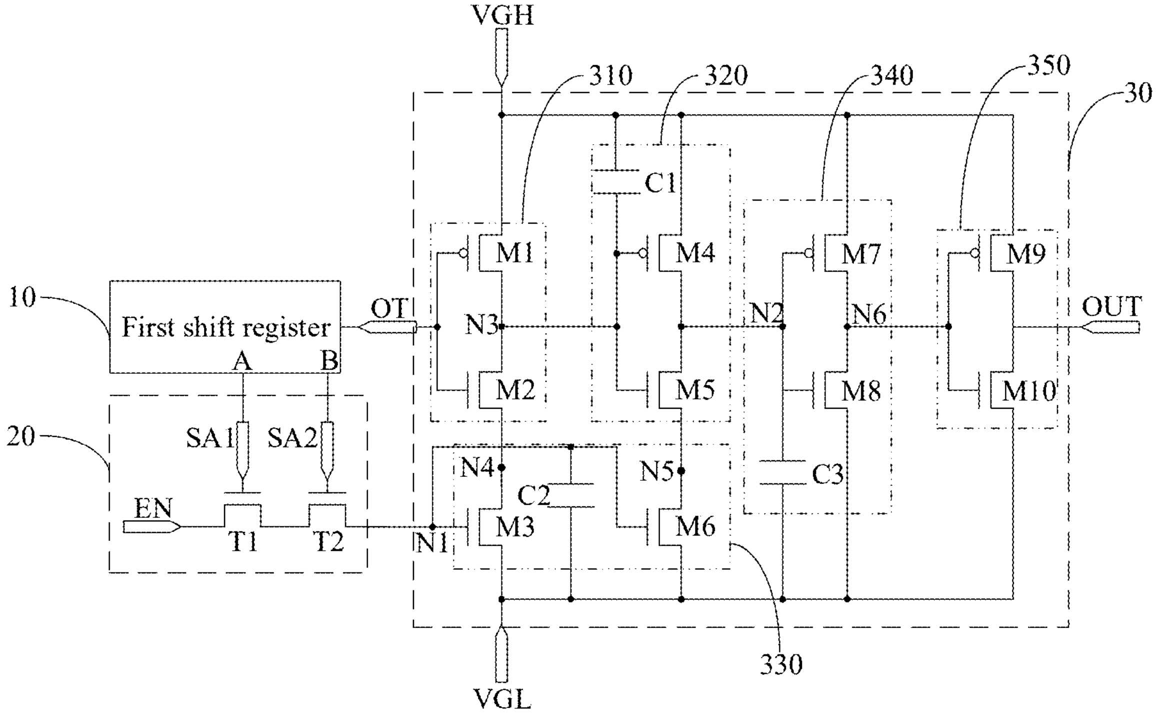
FIG. 20 shows another schematic diagram of some of a structure of a shift register unit according to embodiments of the disclosure.

Embodiments of the disclosure further provide structural schematic diagrams of other shift register units, as shown in FIGS. 18 to 20, which are modified implementations of the above embodiments. Only the differences between the embodiment and the above embodiments will be described below, and similar aspects will not be repeated here.

In some other embodiments of the disclosure, as shown in FIG. 18, the first sampling control terminal SA1 of the current-level shift register unit is coupled to the pull-down node A of the current-level shift register unit, and the second sampling control terminal SA2 is coupled to the pull-up node B of the current-level shift register unit. The sampling circuit 20 is further configured to, in response to the signals at the pull-down node A and the pull-up node B during the sampling phase of the current-level shift register unit, provide the signal from the enable terminal EN to the first node N1.

For example, as shown in FIG. 18, the first sampling control terminal SA1 of the first-level shift register unit D1 is coupled to the pull-down node A of the first-level shift register unit D1, and the second sampling control terminal SA2 is coupled to the pull-up node B of the first-level shift register unit D1. Similarly, the first sampling control terminal SA1 of the second-level shift register unit D2 is coupled to the pull-down node A of the second-level shift register unit D2, and the second sampling control terminal SA2 is coupled to the pull-up node B of the second-level shift register unit D2. The first sampling control terminal SA1 of the (n−1)-th shift register unit Dn−1 is coupled to the pull-down node A of the (n−1)-th level shift register unit Dn−1, and the second sampling control terminal SA2 is coupled to the pull-up node B of the (n−1)-th level shift register unit Dn−1. The first sampling control terminal SA1 of the nth level shift register unit Dn is coupled to the pull-down node A of the nth level shift register unit Dn, and the second sampling control terminal SA2 is coupled to the pull-up node B of the nth level shift register unit Dn.

Figure 21:
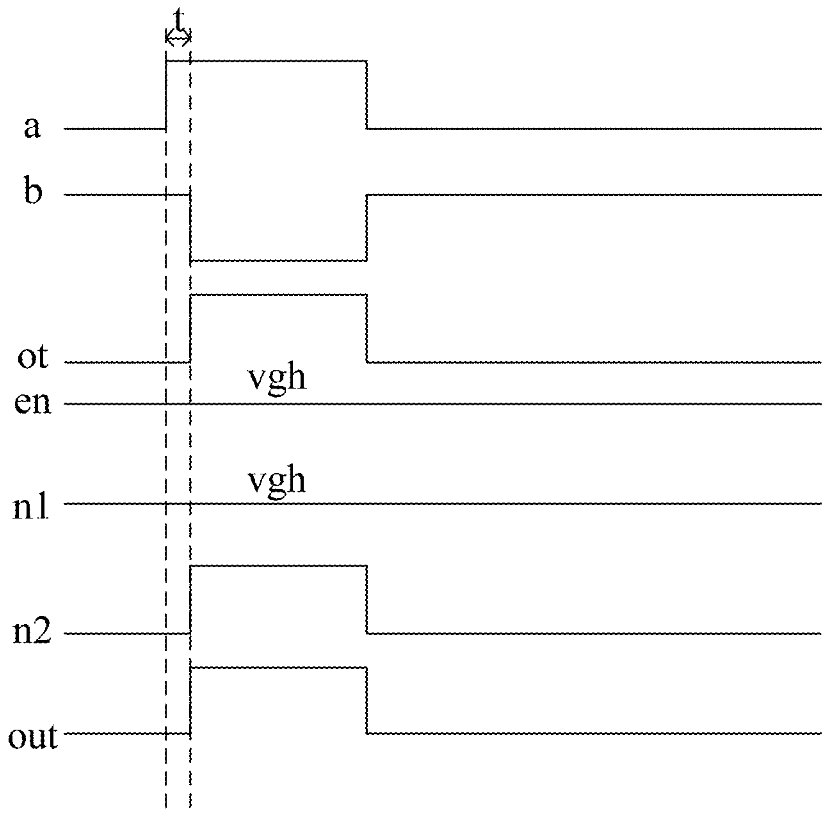
FIG. 21 shows another timing chart for some signals according to embodiments of the disclosure.

Taking the structure of the shift register unit shown in FIG. 20 as an example, the working process of the shift register unit according to the embodiments of the disclosure is described with reference to the signal timing chart shown in FIG. 21.

As shown in FIGS. 21 to 24, reference sign a indicates the signal at the pull-down node A, reference sign b indicates the signal at the pull-up node B, reference sign ot indicates the cascade signal at the cascade signal terminal OT, reference sign en indicates the signal from the enable terminal, reference sign n1 indicates the signal at the first node N1, reference sign n2 indicates the signal at the second node N2, and reference sign out indicates the signal at the drive output terminal OUT, where reference signa vgh indicates the first reference voltage, and reference sign vgl indicates the second reference voltage.

During the full refresh frame, in the sampling phase t, the first transistor T1 is turned on under the control of the high-level signal from the first sampling control terminal SA1, and the second transistor T2 is turned on under the control of the high-level signal from the second sampling control terminal SA2. The first transistor T1 and the second transistor T2 transmit a high-level signal from the enable terminal EN to the first node N1. The control circuit 30, in response to the signal at the first node N1, outputs a gate scan signal with the same timing diagram as the cascade signal ot via the drive output terminal OUT.

Figure 22:
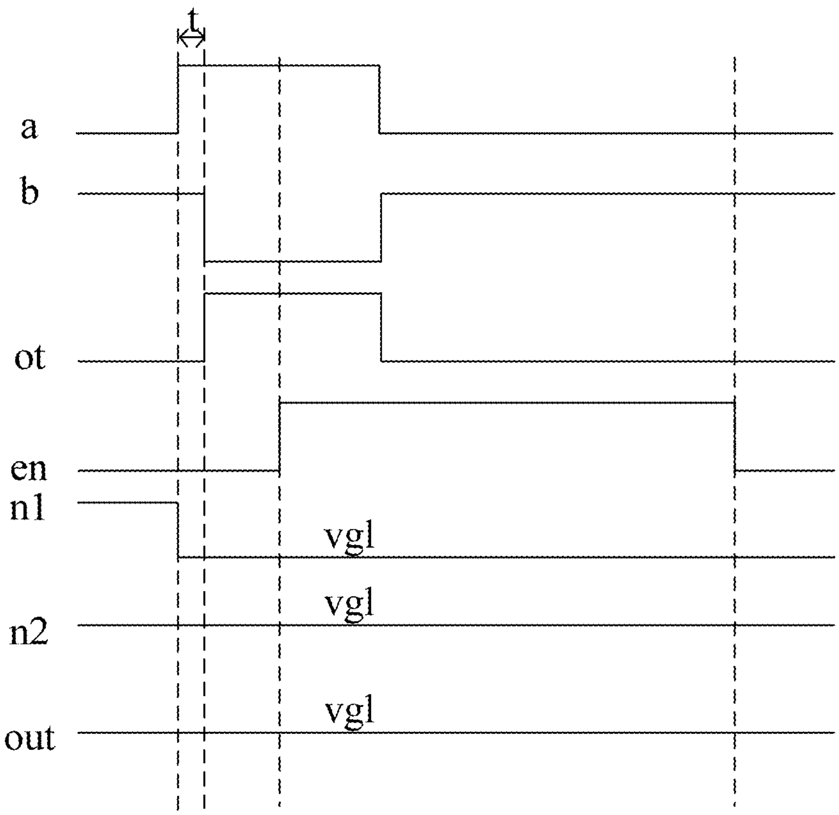
FIG. 22 shows another timing chart for some signals according to embodiments of the disclosure.

Taking the structure of the shift register unit shown in FIG. 20 as an example again, the working process of the shift register unit according to the embodiments of the disclosure is described with reference to the signal timing chart shown in FIG. 22.

During the partial refresh frame, in the sampling phase t, the first transistor T1 is turned on under the control of the high-level signal from the first sampling control terminal SA1, and the second transistor T2 is turned on under the control of the high-level signal from the second sampling control terminal SA2. The first transistor T1 and the second transistor T2 transmit a low-level signal from the enable terminal EN to the first node N1. The control circuit 30, in response to the signal at the first node N1, outputs a gate off signal via the drive output terminal OUT.

Figure 23:
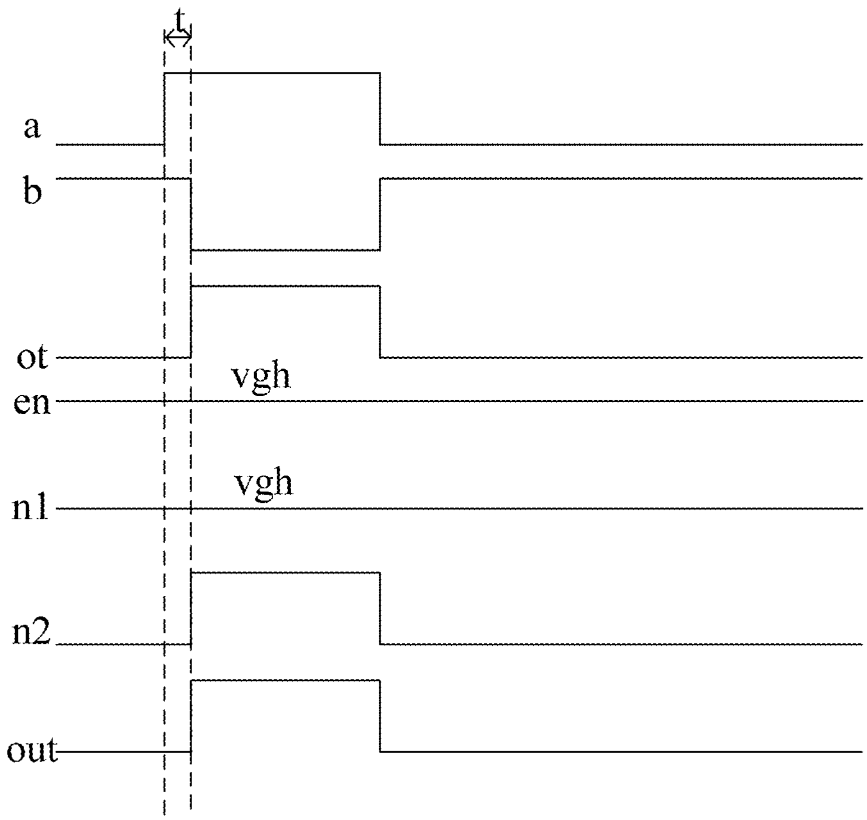
FIG. 23 shows another timing chart for some signals according to embodiments of the disclosure.

Taking the structure of the shift register unit shown in FIG. 20 as an example again, the working process of the shift register unit according to the embodiments of the disclosure is described with reference to the signal timing diagram shown in FIG. 23.

During the full refresh frame, in the sampling phase t, the first transistor T1 is turned on under the control of the high-level signal from the first sampling control terminal SA1, and the second transistor T2 is turned on under the control of the high-level signal from the second sampling control terminal SA2. The first transistor T1 and the second transistor T2 transmit a high-level signal from the enable terminal EN to the first node N1. The control circuit 30, in response to the signal at the first node N1, outputs a gate scan signal with the same timing diagram as the cascade signal ot via the drive output terminal OUT.

Figure 24:
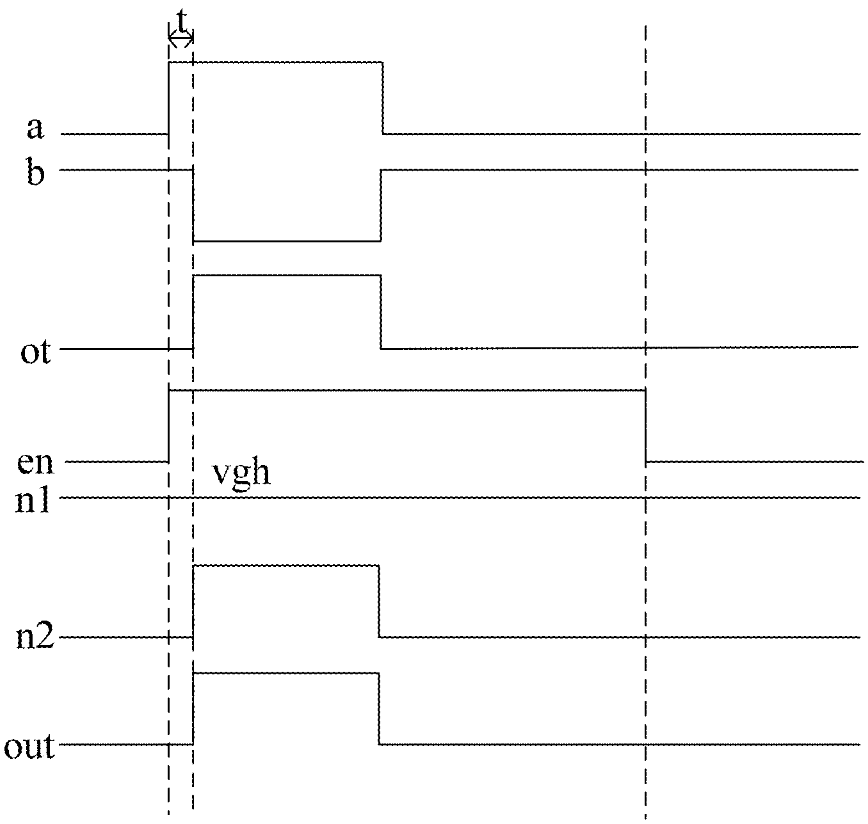
FIG. 24 shows another timing chart for some signals according to embodiments of the disclosure.

Taking the shift register unit structure shown in FIG. 20 as an example, combined with the signal timing chart shown in FIG. 24, the working process of the shift register unit according to embodiments of the disclosure will be described below.

During a partial refresh frame, in the sampling phase t, the first transistor T1 is turned on under the control of the high-level signal from the first sampling control terminal SA1, and the second transistor T2 is turned on under the control of the high-level signal from the second sampling control terminal SA2. The first transistor T1 and the second transistor T2 transmit the high-level signal from the enable terminal EN to the first node N1N1. The control circuit 30, in response to the signal at the first node N1, outputs a gate scan signal with the same timing diagram as the cascade signal ot via the driving output terminal OUT.

Figure 25:
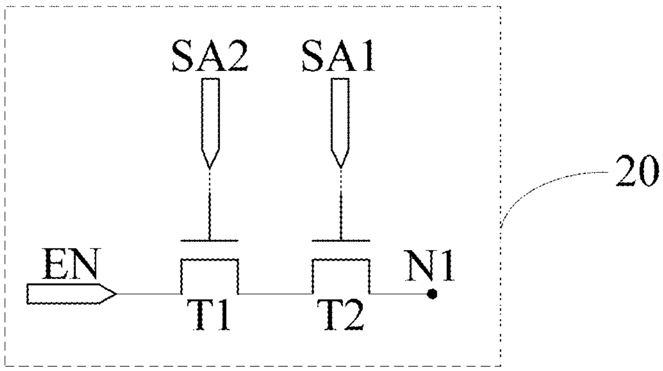
FIG. 25 shows another schematic diagram of some of a structure of a shift register unit according to embodiments of the disclosure.
Figure 26:
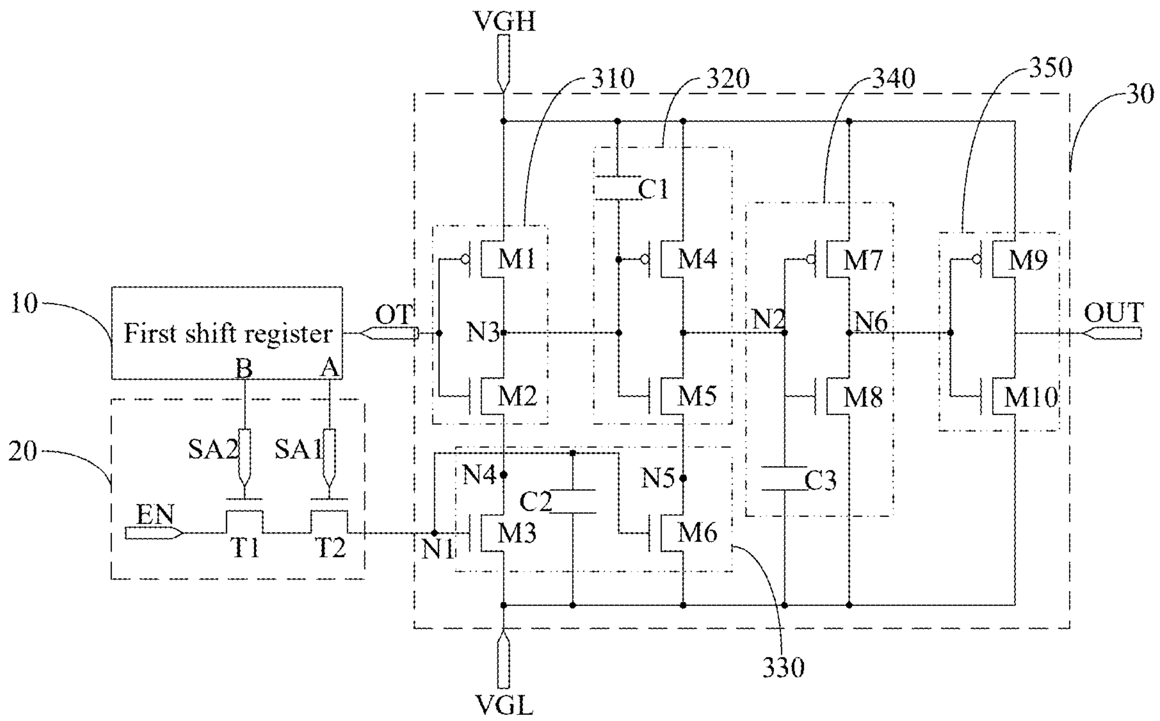
FIG. 26 shows another schematic diagram of some of a structure of a shift register unit according to embodiments of the disclosure.

Embodiments of the disclosure further provide schematic diagrams of some other structures of the shift register unit, as shown in FIGS. 25 to 26, which are variations of the embodiments described above. Only the differences between this embodiment and the aforementioned embodiments will be described below, and the similarities will not be repeated here.

Taking the shift register unit structure shown in FIG. 26 as an example, combined with the signal timing chart shown in FIG. 21, the working process of the shift register unit according to embodiments of the disclosure will be described.

During a full refresh frame, in the sampling phase t, the second transistor T2 is turned on under the control of the high-level signal from the first sampling control terminal SA1, and the first transistor T1 is turned on under the control of the high-level signal from the second sampling control terminal SA2. The first transistor T1 and the second transistor T2 transmit the high-level signal from the enable terminal EN to the first node N1. The control circuit 30, in response to the signal at the first node N1, outputs a gate scan signal with the same timing chart as the cascade signal ot via the driving output terminal OUT.

Taking the shift register unit structure shown in FIG. 26 as an example, combined with the signal timing chart shown in FIG. 22, the working process of the shift register unit according to embodiments of the disclosure will be described.

During a partial refresh frame, in the sampling phase t, the second transistor T2 is turned on under the control of the high-level signal from the first sampling control terminal SA1, and the first transistor T1 is turned on under the control of the high-level signal from the second sampling control terminal SA2. The first transistor T1 and the second transistor T2 transmit the low-level signal from the enable terminal EN to the first node N1N1. The control circuit 30, in response to the signal at the first node N1, outputs a gate off signal via the driving output terminal OUT.

Taking the shift register unit structure shown in FIG. 26 as an example, combined with the signal timing chart shown in FIG. 23, the working process of the shift register unit according to embodiments of the disclosure will be described.

During a full refresh frame, in the sampling phase t, the second transistor T2 is turned on under the control of the high-level signal from the first sampling control terminal SA1, and the first transistor T1 is turned on under the control of the high-level signal from the second sampling control terminal SA2. The first transistor T1 and the second transistor T2 transmit the high-level signal from the enable terminal EN to the first node N1. The control circuit 30, in response to the signal at the first node N1, outputs a gate scan signal with the same timing chart as the cascade signal ot via the driving output terminal OUT.

Taking the shift register unit structure shown in FIG. 26 as an example, combined with the signal timing chart shown in FIG. 24, the working process of the shift register unit according to embodiments of the disclosure will be described.

During a partial refresh frame, in the sampling phase t, the second transistor T2 is turned on under the control of the high-level signal from the first sampling control terminal SA1, and the first transistor T1 is turned on under the control of the high-level signal from the second sampling control terminal SA2. The first transistor T1 and the second transistor T2 provide the high-level signal from the enable terminal EN to the first node N1. The control circuit 30, in response to the signal at the first node N1, outputs a gate scan signal with the same timing diagram as the cascade signal ot via the driving output terminal OUT.

Embodiments of the disclosure further provide schematic diagrams of other structures of the shift register unit, as shown in FIGS. 27 to 31, which are variations of the embodiments described above. Only the differences between this embodiment and the aforementioned embodiments will be described below, and the similarities will not be repeated here.

Figure 27:
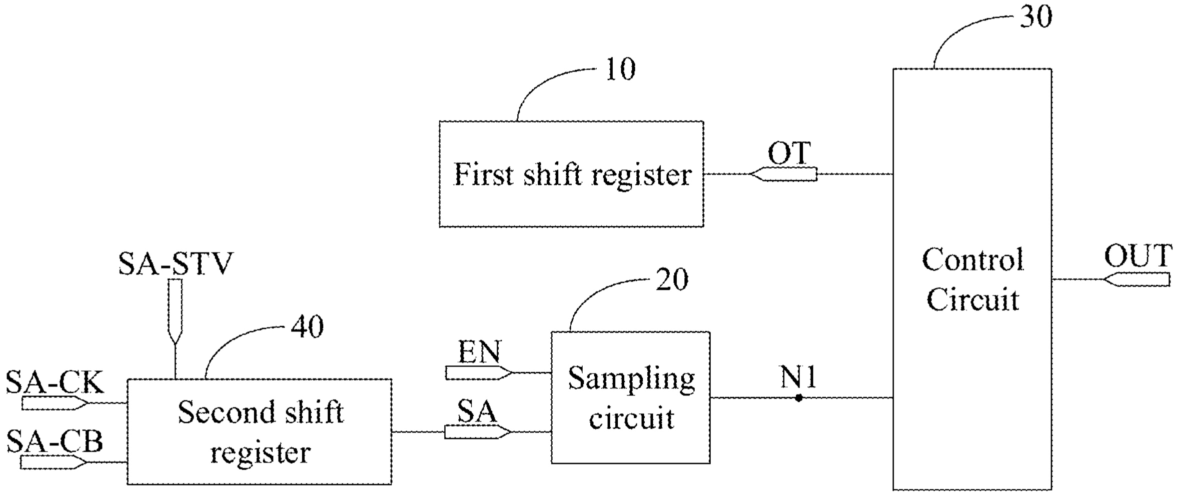
FIG. 27 shows another schematic diagram of some of a structure of a shift register unit according to embodiments of the disclosure.

In some embodiments of the disclosure, as shown in FIG. 27, the shift register unit further includes: a second shift register 40. The second shift register 40 is coupled to the sampling control terminal SA and is configured to input a signal to the sampling control terminal SA based on signals from a sampling control input terminal SA-STV, a first sampling control clock signal terminal SA-CK, and a second sampling control clock signal terminal SA-CB.

Figure 28:
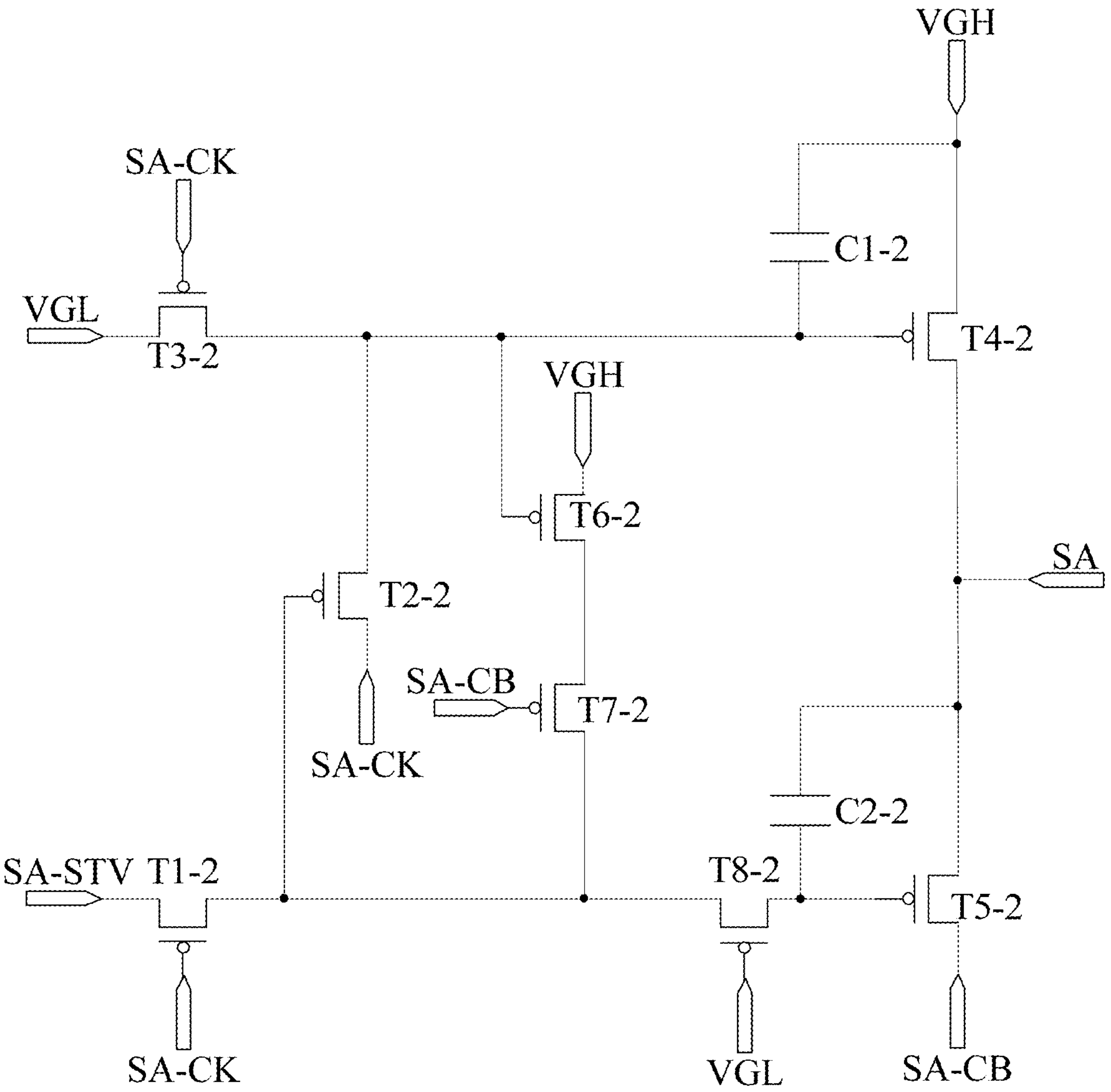
FIG. 28 shows another schematic diagram of some of a structure of a shift register unit according to embodiments of the disclosure.

For example, as shown in FIG. 28, the second shift register 40 includes: a first second-number transistor T1-2, a second second-number transistor T2-2, a third second-number transistor T3-2, a fourth second-number transistor T4-2, a fifth second-number transistor T5-2, a sixth second-number transistor T6-2, a seventh second-number transistor T7-2, an eighth second-number transistor T8-2, a first second-number capacitor C1-2, and a second second-number capacitor C2-2. A gate of the first second-number transistors T1-2 is coupled to the first sampling control clock signal terminal SA-CK, a first electrode of the first second-number transistor T1-2 is coupled to the sampling control input terminal SA-STV, and a second electrode of the first second-number transistor T1-2 is coupled to a first electrode of the eighth second-number transistor T8-2. A gate of the eighth second-number transistor T8-2 is coupled to the second reference signal terminal VGL, and the second electrode of the eighth second-number transistor T8-2 is coupled to a gate of the fifth second-number transistor T5-2. A first electrode of the fifth second-number transistor T5-2 is coupled to the sampling control terminal SA, and the second electrode of the fifth second-number transistor T5-2 is coupled to the second sampling control clock signal terminal SA-CB. A gate of the third second-number transistor T3-2 is coupled to the first sampling control clock signal terminal SA-CK, a first electrode of the third second-number transistor T3-2 is coupled to the second reference signal terminal VGL, and the second electrode of the third second-number transistor T3-2 is coupled to the first electrode of the second second-number transistor T2-2. A gate of the second second-number transistor T2-2 is coupled to the second electrode of the first second-number transistor T1-2, and the second electrode of the second second-number transistor T2-2 is coupled to the first sampling control clock signal terminal SA-CK. A gate of the fourth second-number transistor T4-2 is coupled to the second electrode of the third second-number transistor T3-2, the first electrode of the fourth second-number transistor T4-2 is coupled to the first reference signal terminal VGH, and the second electrode of the fourth second-number transistor T4-2 is coupled to the sampling control terminal SA. A gate of the sixth second-number transistor T6-2 is coupled to the second electrode of the third second-number transistor T3-2, the first electrode of the sixth second-number transistor T6-2 is coupled to the first reference signal terminal VGH, and the second electrode of the sixth second-number transistor T6-2 is coupled to the first electrode of the seventh second-number transistor T7-2. A gate of the seventh second-number transistor T7-2 is coupled to the second sampling control clock signal terminal SA-CB, and the second electrode of the seventh second-number transistor T7-2 is coupled to the second electrode of the first second-number transistor T1-2. A first electrode of the first second-number capacitor C1-2 is coupled to the first reference signal terminal VGH, and the second electrode of the first second-number capacitor C1-2 is coupled to the gate of the fourth second-number transistor T4-2. A first electrode of the second second-number capacitor C2-2 is coupled to the sampling control terminal SA, and a second electrode of the second second-number capacitor C2-2 is coupled to the gate of the fifth second-number transistor T5-2.

It should be noted that the structure of the second shift register mentioned above is only an example, and in practical application, it can also be other structures, which are not limited here.

Figure 29:
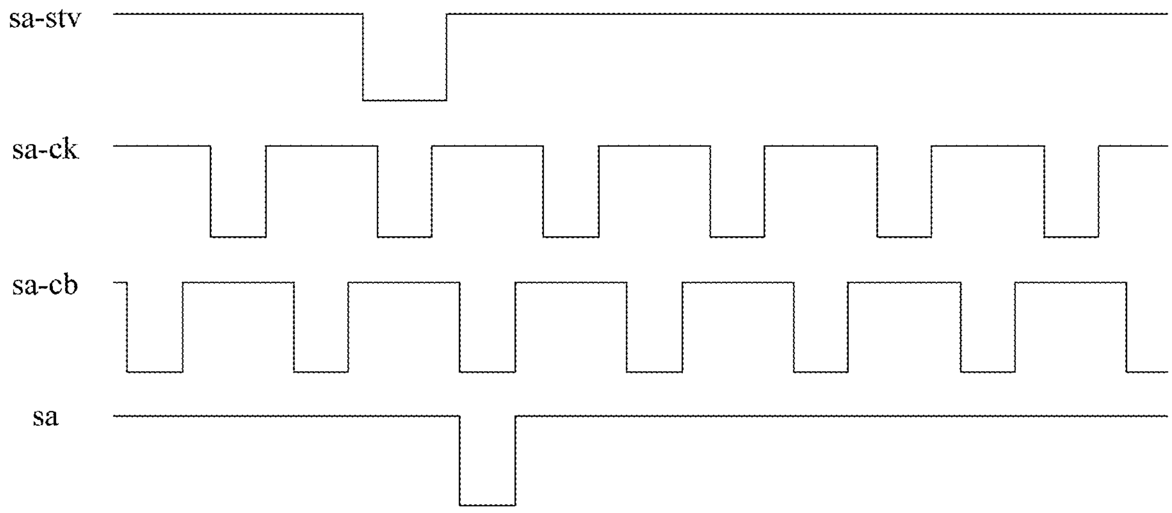
FIG. 29 shows another timing chart for some signals according to embodiments of the disclosure.

For example, as shown in FIG. 29, reference sign sa-stv indicates the signal from the sampling control input terminal SA-STV, reference sign sa-ck indicates the signal from the first sampling control clock signal terminal SA-CK, reference sign sa-cb indicates the signal from the second sampling control clock signal terminal SA-CB, and reference sa indicates the signal from the sampling control terminal SA.

Figure 30:
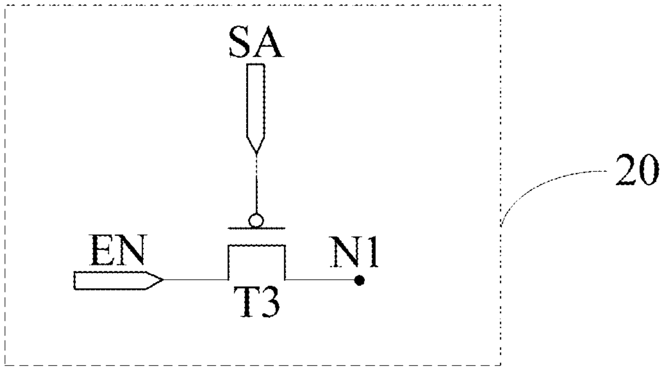
FIG. 30 shows another schematic diagram of some of a structure of a shift register unit according to embodiments of the disclosure.

In some embodiments of the disclosure, as shown in FIG. 30, the sampling circuit 20 includes: a third transistor T3. A gate of the third transistor T3 is coupled to the sampling control terminal SA, a first terminal of the third transistor T3 is coupled to the enable end EN, and a second terminal of the third transistor T3 is coupled to the first node N1.

Figure 32:
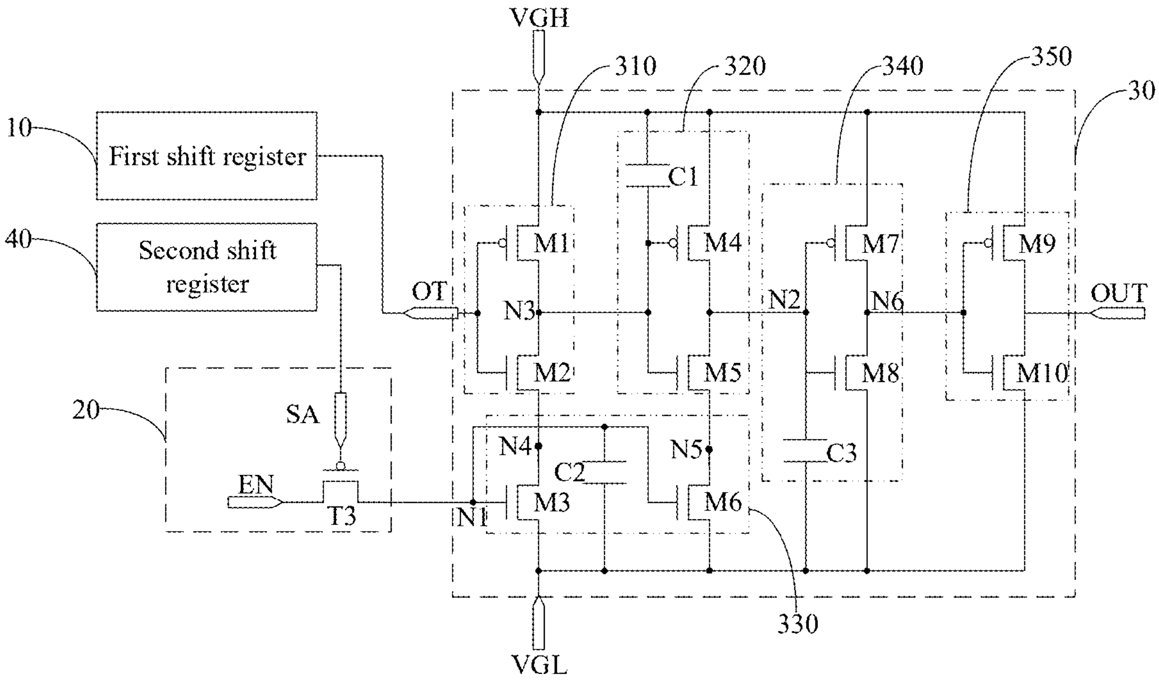
FIG. 32 shows another schematic diagram of some of a structure of a shift register unit according to embodiments of the disclosure.
Figure 33:
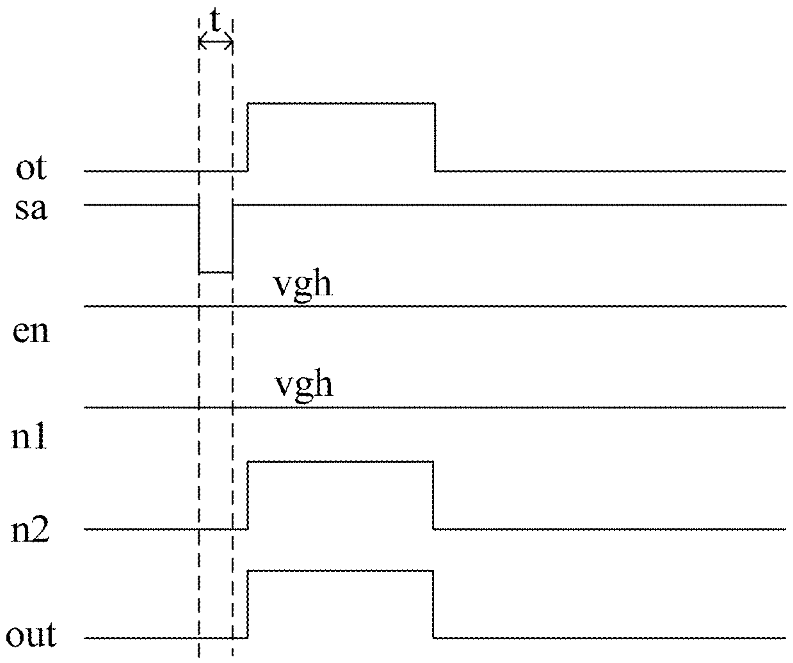
FIG. 33 shows another timing chart for some signals according to embodiments of the disclosure.

The working process of the shift register unit according to the embodiments of the disclosure is described below by taking the shift register unit structure shown in FIG. 32 as an example, combined with the timing chart shown in FIG. 33.

As shown in FIGS. 34 to 37, reference sign ot indicates the signal from the cascading signal terminal OT, reference sign sa indicates the signal from the sampling control terminal SA, reference sign en indicates the signal from the enable terminal EN, reference sign n1 indicates the signal at the first node N1, reference sign n2 indicates the signal at the second node N2, and reference sign out indicates the signal at the drive output terminal OUT. Reference sign vgh indicates the first reference voltage and reference sign vgl indicates the second reference voltage.

In the full refresh frame, during time t, the third transistor T3 is turned on under the low-level signal from the sampling control terminal SA, and the third transistor T3 transmits the high-level signal from the enable terminal EN to the first node N1. The control circuit 30, in response to the signal at the first node N1, outputs a gate scan signal with the same timing diagram as the cascade signal ot via drive output terminal OUT.

Figure 34:
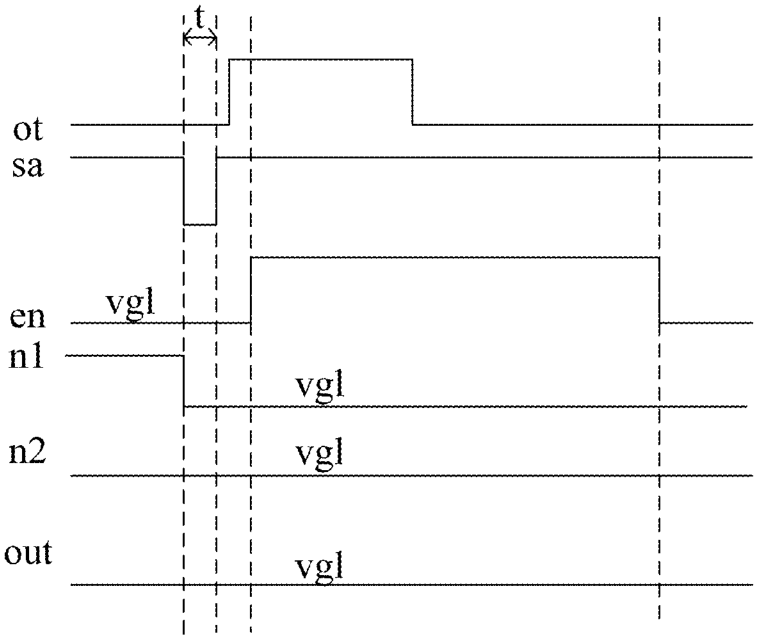
FIG. 34 shows another timing chart for some signals according to embodiments of the disclosure.

The working process of the shift register unit according to the embodiments of the disclosure is described below by taking the shift register unit structure shown in FIG. 32 as an example, combined with the signal timing chart shown in FIG. 34.

In the partial refresh frame, during time t, the third transistor T3 is turned on under the low-level signal from the sampling control terminal SA, and the third transistor T3 transmits the low-level signal from the enable terminal EN to the first node N1. The control circuit 30, in response to the signal at the first node N1, outputs the gate off signal via the drive output terminal OUT.

Figure 35:
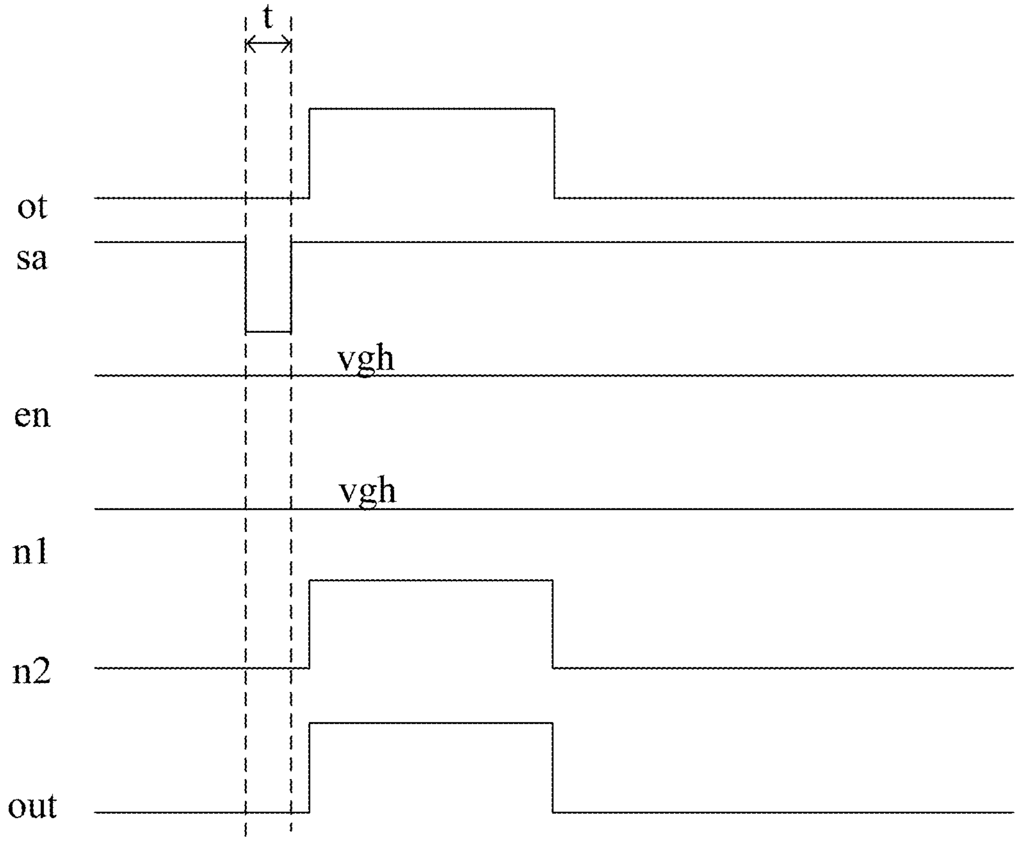
FIG. 35 shows another timing chart for some signals according to embodiments of the disclosure.

The working process of the shift register unit according to the embodiment of the disclosure is described below by taking the shift register unit structure shown in FIG. 32 as an example, combined with the signal timing chart shown in FIG. 35.

In the full refresh frame, during time t, the third transistor T3 is turned on under the low-level signal from the sampling control terminal SA, and the third transistor T3 transmits the high-level signal from the enable terminal EN to the first node N1. The control circuit 30, in response to the signal at the first node N1, outputs a gate scan signal with the same timing diagram as the cascade signal ot via the drive output terminal OUT.

Figure 36:
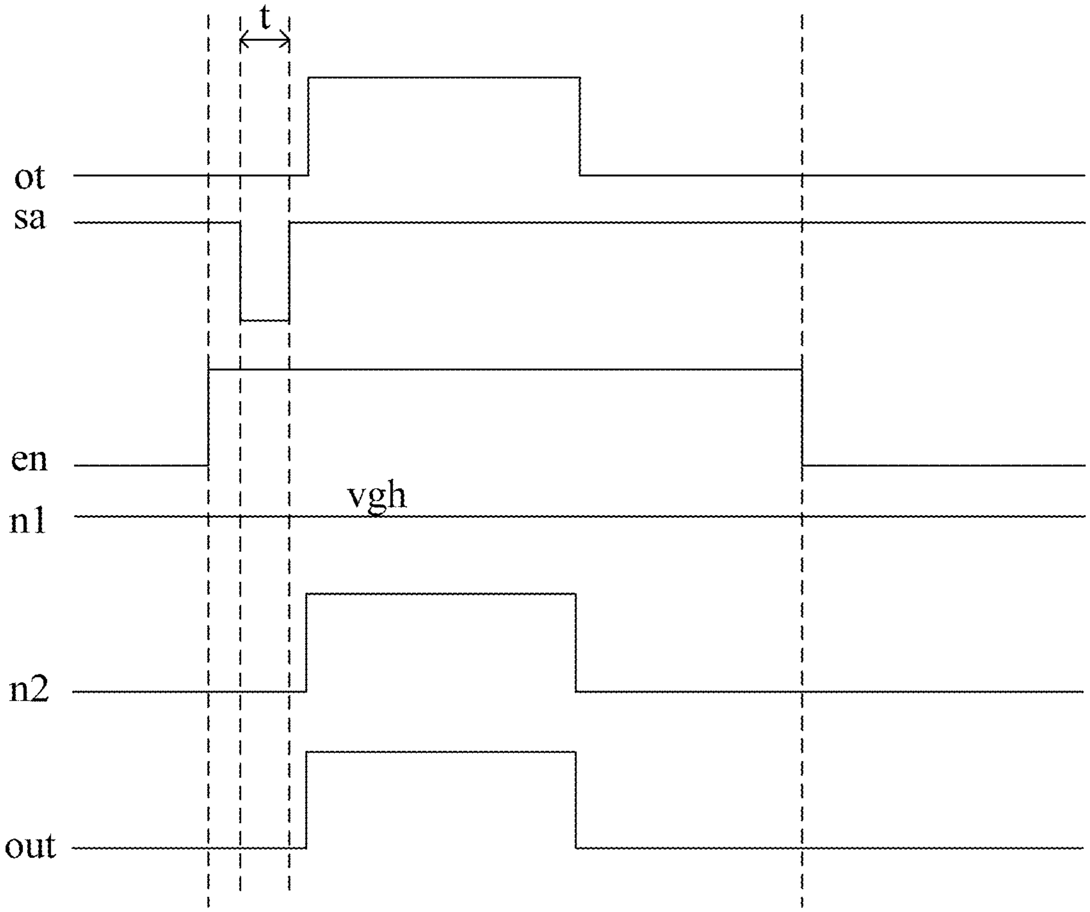
FIG. 36 shows another timing chart for some signals according to embodiments of the disclosure.

The working process of the shift register unit according to the embodiment of the disclosure is described below by taking the shift register unit structure shown in FIG. 32 as an example, combined with the signal timing chart shown in FIG. 36.

In the partial refresh frame, during time t, the third transistor T3 is turned on under the low-level signal from the sampling control terminal SA, and the third transistor T3 transmits the high-level signal from the enable terminal EN to the first node N1. The control circuit 30, in response to the signal at the first node N1, outputs a gate scan signal with the same timing diagram as the cascade signal ot via the drive output terminal OUT.

Figure 31:
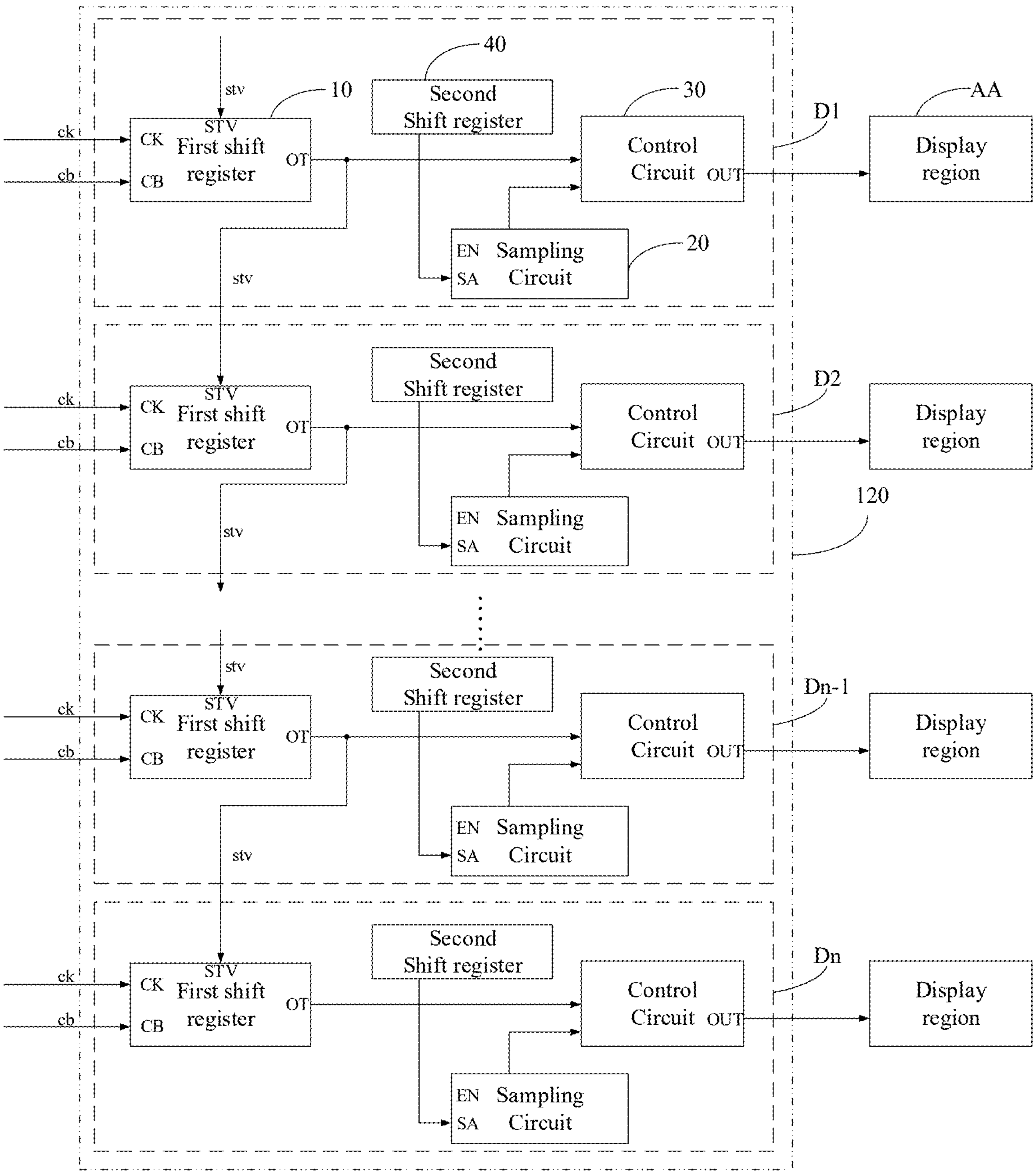
FIG. 31 shows another schematic diagram of some of a structure of a shift register unit according to embodiments of the disclosure.

Based on the same invention conception, embodiments of the disclosure provide a gate drive circuit 120, as shown in FIGS. 6, 18 and 31, including: a plurality of above-mentioned shift register units (e.g., shift register units D1, D2, Dn−1 in the figures). The first shift registers 10 in a plurality of shift register units are cascaded. The principle of solving problem by the gate drive circuit 120 is similar to that of the aforementioned shift register unit, so the implementation of the gate drive circuit 120 can refer to the implementation of the aforementioned shift register unit (for example, shift register units D1, D2, Dn−1 in the figures), and the repetition will not be repeated here.

Figure 37:
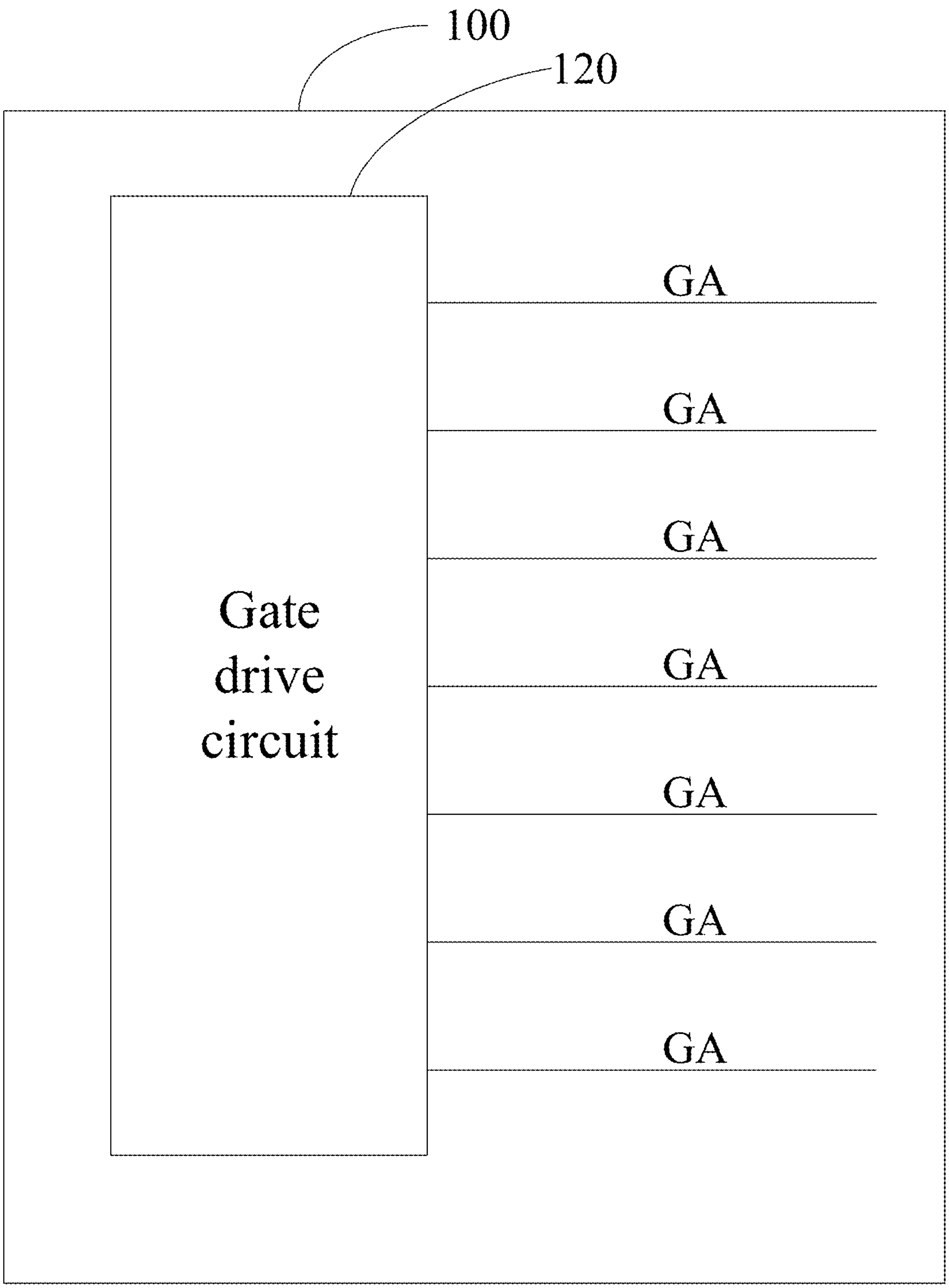
FIG. 37 shows a schematic diagram of some of a structure of a display panel according to embodiments of the disclosure.

Based on the same invention conception, embodiments of the disclosure provide a display panel 100, as shown in FIG. 37, including: a plurality of gate lines GA and the above-mentioned gate drive circuit 120. One of the plurality of gate lines GA is coupled to a drive output terminal OUT of one of the shift register units in the gate drive circuit 120 (e.g., shift register units D1, D2, Dn−1, Dn in FIGS. 6, 18 and 31). The principle of solving problem by the display panel 100 is similar to that of the gate drive circuit 120, so the implementation of the display panel 100 can refer to the implementation of the gate drive circuit 120 mentioned above, and the repetition is not repeated here.

Figure 38:
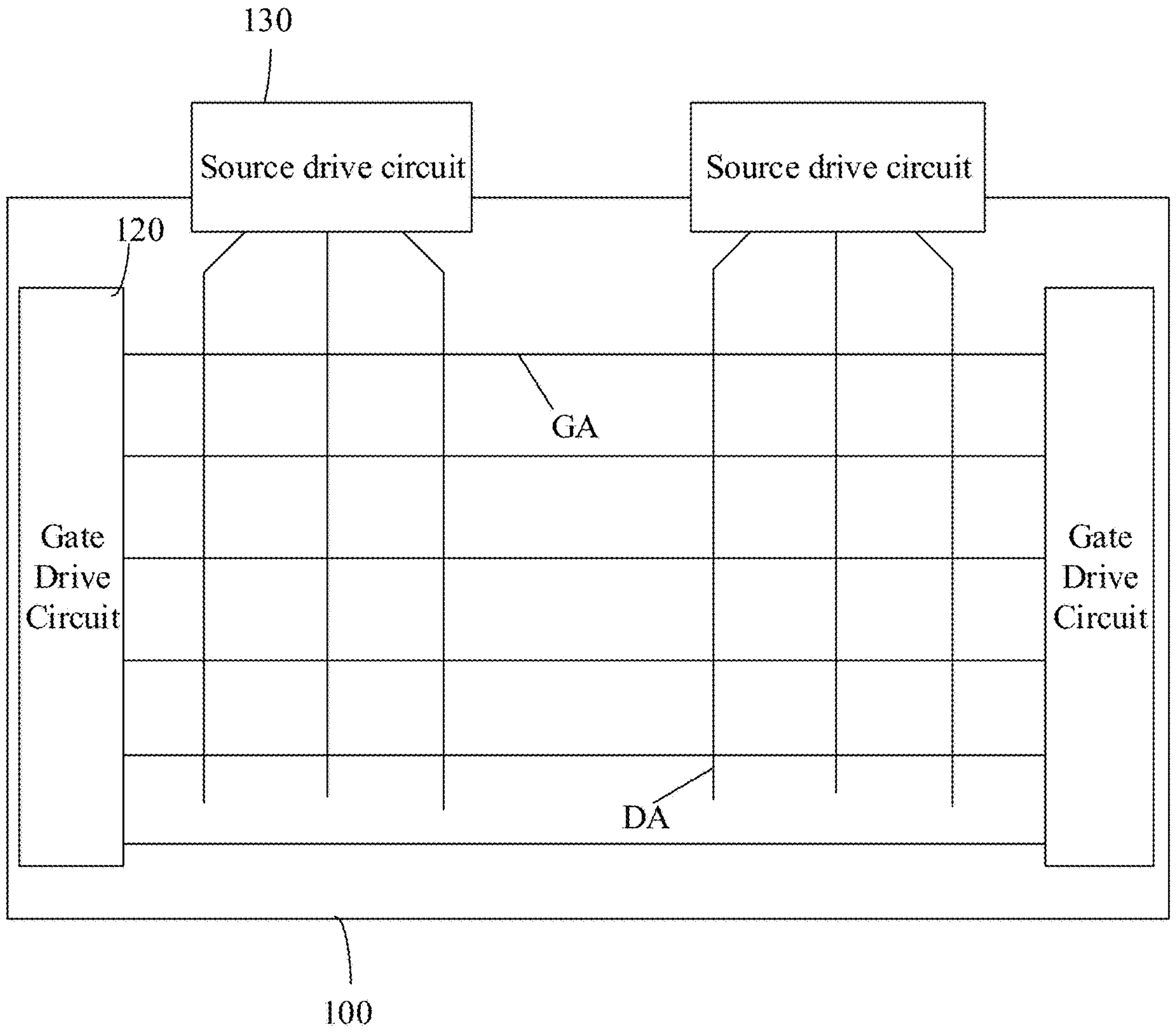
FIG. 38 shows another schematic diagram of some of a structure of a display panel according to embodiments of the disclosure.

In some embodiments, as shown in FIG. 38, the display panel 100 further includes: a plurality of data lines DA and a source drive circuit 130.

In some embodiments, the plurality of shift register units (e.g., shift register units D1, D2, Dn−1, and Dn in FIGS. 6, 18 and 31) are coupled to the plurality of gate lines GAs, and the source drive circuit 130 is coupled to the plurality of data line DAs, respectively. When the display panel 100 is working, a control signal is input to the gate drive circuit 120, so that the gate drive circuit 120 outputs signals to the coupled gate lines GA, thereby driving the gate lines GA. In addition, the source drive circuit 130 inputs data voltage to data lines DA according to the display data, thereby charging the sub-pixels, to allow the sub-pixels to be input with the corresponding data voltage, realizing the screen display function.

In some embodiments, two source drive circuits 130 can be provided, where one source drive circuit 130 can connect half the number of data lines, and the other source drive circuit 130 can connect the other half number of data lines. Of course, in practical application, the number of the source drive circuit 130 can also be 3, 4, or more, which can be determined according to the needs of the actual application environment, which is not limited here.

In some embodiments of the disclosure, one column of sub-pixels can be made to correspond to one data line DA. Of course, it is also possible to make one column of sub-pixels correspond to multiple data line DA, which is not limited here.

In specific implementations, in embodiments of the disclosure, the display device may be: a mobile phone, a tablet computer, a television, a monitor, a notebook computer, a digital photo frame, a navigator and any other product or component with a display function. The other indispensable components of the display device are those should be understood by ordinary skill in the art, and are not repeated herein, nor should they be used as a limitation on the invention.

The foregoing illustrates only specific embodiments of the disclosure, but the scope of protection of the disclosure is not limited to this. Changes or substitutions obtained by any person skilled in the art who is familiar with the art within the scope of the technology disclosed in this application, should be covered by the scope of protection of this application.

What is claimed is:

1. A shift register unit, comprising:

a first shift register configured to output a cascade signal via a cascade output terminal;

a sampling circuit coupled to a first node and configured to provide a signal from an enable terminal to the first node in response to a signal from a sampling control terminal; and a control circuit, wherein an input terminal of the control circuit is coupled to the cascade output terminal and the first node; and the control circuit is configured to, in response to a signal at the first node, output a gate scan signal with a same timing diagram as the cascade signal via a drive output terminal, or output a gate off signal via the drive output terminal;

wherein the sampling circuit is further configured to provide the signal from the enable terminal to the first node in response to the signal from the sampling control terminal during a sampling phase;

wherein the sampling phase is between a start moment of an active level of a cascade signal of a previous-level shift register unit and a start moment of an active level of a cascade signal of a current-level shift register unit;

wherein the sampling control terminal comprises a first sampling control terminal and a second sampling control terminal; wherein the sampling circuit is further configured to provide the signal from the enable terminal to the first node in response to both signals from the first sampling control terminal and the second sampling control terminal;

wherein a first sampling control terminal of the current-level shift register unit is coupled to a cascade output terminal of the current-level shift register unit, and a second sampling control terminal of the current-level shift register unit is coupled to a cascade output terminal of the previous-level shift register unit; wherein the sampling circuit is further configured to provide the signal from the enable terminal to the first node in response to the cascade signal of the current-level shift register unit and the cascade signal of the previous-level shift register unit during the sampling phase;

or, wherein a first sampling control terminal of the current-level shift register unit is coupled to a pull-down node of the current-level shift register unit, and a second sampling control terminal of the current-level shift register unit is coupled to a pull-up node of the current-level shift register unit; wherein the sampling circuit is further configured to provide the signal from the enable terminal to the first node in response to a signal at the pull-down node and a signal at the pull-up node of the current-level shift register unit during the sampling phase;

or, wherein the shift register unit further comprises a second shift register; wherein the second shift register is coupled to the sampling control terminal and is configured to input a signal to the sampling control terminal based on signals from a sampling control input terminal, a first sampling control clock signal terminal, and a second sampling control clock signal terminal.

2. The shift register unit according to claim 1, wherein the sampling circuit comprises a first transistor and a second transistor;

wherein, a gate of the first transistor is coupled to the first sampling control terminal, a first terminal of the first transistor is coupled to the enable terminal, a second terminal of the first transistor is coupled to a first terminal of the second transistor, a gate of the second transistor is coupled to the second sampling control terminal, and a second terminal of the second transistor is coupled to the first node; or a gate of the first transistor is coupled to the second sampling control terminal, a first terminal of the first transistor is coupled to the enable terminal, a second terminal of the first transistor is coupled to a first terminal of the second transistor, a gate of the second transistor is coupled to the first sampling control terminal, and a second terminal of the second transistor is coupled to the first node.

3. The shift register unit according to claim 1, wherein the sampling circuit comprises a third transistor;

wherein a gate of the third transistor is coupled to the sampling control terminal, a first terminal of the third transistor is coupled to the enable terminal, and a second terminal of the third transistor is coupled to the first node.

4. The shift register unit according to claim 1, wherein the control circuit comprises:

a first control sub-circuit configured to, in response to the cascade signal from the cascade signal terminal, provide a signal from a first reference signal terminal to a third node or provide a signal at a fourth node to the third node;

a second control sub-circuit configured to, in response to a signal at the third node, provide the signal from the first reference signal terminal to a second node or provide a signal from a fifth node to the second node;

a third control sub-circuit configured to, in response to a signal at the first node, provide a signal from a second reference signal terminal to the fourth node and the fifth node;

a fourth control sub-circuit configured to, in response to a signal at the second node, provide the signal from the first reference signal terminal to a sixth node or provide the signal from the second reference signal terminal to the sixth node; and a fifth control sub-circuit configured to, in response to a signal at the sixth node, provide the signal from the first reference signal terminal to the drive output terminal or provide the signal from the second reference signal terminal to the drive output terminal.

5. The shift register unit according to claim 4, wherein the first control sub-circuit comprises: a first control transistor and a second control transistor;

wherein, a gate of the first control transistor is coupled to the cascade output terminal, a first terminal of the first control transistor is coupled to the first reference signal terminal, and a second terminal of the first control transistor is coupled to the third node; and a gate of the second control transistor is coupled to the cascade output terminal, a first terminal of the second control transistor is coupled to the third node, and a second terminal of the second control transistor is coupled to the fourth node.

6. The shift register unit according to claim 4, wherein the second control sub-circuit comprises: a fourth control transistor, a fifth control transistor, and a first capacitor;

wherein, a gate of the fourth control transistor is coupled to the third node, a first terminal of the fourth control transistor is coupled to the first reference signal terminal, and a second terminal of the fourth control transistor is coupled to the second node;

a gate of the fifth control transistor is coupled to the third node, a first terminal of the fifth control transistor is coupled to the second node, and a second terminal of the fifth control transistor is coupled to the fifth node; and a first electrode of the first capacitor is coupled to the first reference signal terminal, and a second electrode of the first capacitor is coupled to the gate of the fourth control transistor.

7. The shift register unit according to claim 4, wherein the third control sub-circuit comprises: a third control transistor, a sixth control transistor, and a second capacitor;

wherein, a gate of the third control transistor is coupled to the first node, a first terminal of the third control transistor is coupled to the fourth node, and a second terminal of the third control transistor is coupled to the second reference signal terminal;

a gate of the sixth control transistor is coupled to the first node, a first terminal of the sixth control transistor is coupled to the fifth node, and a second terminal of the sixth control transistor is coupled to the second reference signal terminal; and a first electrode of the second capacitor is coupled to the first node, and a second electrode of the second capacitor is coupled to the second reference signal terminal.

8. The shift register unit according to claim 4, wherein the fourth control sub-circuit comprises: a seventh control transistor, an eighth control transistor, and a third capacitor;

wherein, a gate of the seventh control transistor is coupled to the second node, a first terminal of the seventh control transistor is coupled to the first reference signal terminal, and a second terminal of the seventh control transistor is coupled to the sixth node;

a gate of the eighth control transistor is coupled to the second node, a first terminal of the eighth control transistor is coupled to the sixth node, and a second terminal of the eighth control transistor is coupled to the second reference signal terminal; and a first electrode of the third capacitor is coupled to the second node, and a second electrode of the third capacitor is coupled to the second reference signal terminal.

9. The shift register unit according to claim 4, wherein the fifth control sub-circuit comprises: a ninth control transistor and a tenth control transistor;

wherein, a gate of the ninth control transistor is coupled to the sixth node, a first terminal of the ninth control transistor is coupled to the first reference signal terminal, and a second terminal of the ninth control transistor is coupled to the drive output terminal; and a gate of the tenth control transistor is coupled to the sixth node, a first terminal of the tenth control transistor is coupled to the drive output terminal, and a second terminal of the tenth control transistor is coupled to the second reference signal terminal.

10. A gate driving circuit, comprising: a plurality of shift register units according to claim 1;

wherein first shift registers in the plurality of shift register units are cascaded.

11. A display panel, comprising: a plurality of gate lines and the gate driving circuit according to claim 10;

wherein one gate line of the plurality of gate lines is coupled to a drive output terminal of one shift register unit in the gate driving circuit.

12. A drive method for the shift register unit according to claim 1, comprising:

outputting, by the first shift register, the cascade signal via the cascade output terminal;

providing, by the sampling circuit, the signal from the enable terminal to the first node in response to the signal from the sampling control terminal; and outputting, by the control circuit, the gate scan signal with the same timing diagram as the cascade signal via the drive output terminal or the gate off signal via the drive output terminal, in response to the signal at the first node.

* * * * *